United States Patent
Hwang et al.

(10) Patent No.: US 12,289,786 B2
(45) Date of Patent: Apr. 29, 2025

(54) METHOD AND DEVICE FOR HANDOVER IN NEXT GENERATION MOBILE COMMUNICATION SYSTEM

(71) Applicant: Samsung Electronics Co., Ltd., Suwon-si (KR)

(72) Inventors: June Hwang, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 17/442,969

(22) PCT Filed: Mar. 27, 2020

(86) PCT No.: PCT/KR2020/004170
§ 371 (c)(1),
(2) Date: Sep. 24, 2021

(87) PCT Pub. No.: WO2020/197307
PCT Pub. Date: Oct. 1, 2020

(65) Prior Publication Data
US 2022/0191753 A1    Jun. 16, 2022

(30) Foreign Application Priority Data

Mar. 28, 2019 (KR) .................. 10-2019-0035983
Mar. 28, 2019 (KR) .................. 10-2019-0036220
Mar. 26, 2020 (KR) .................. 10-2020-0037139

(51) Int. Cl.
*H04W 36/00*     (2009.01)
*H04W 36/08*     (2009.01)
(Continued)

(52) U.S. Cl.
CPC ....... *H04W 76/20* (2018.02); *H04W 36/0058* (2018.08); *H04W 36/0061* (2013.01);
(Continued)

(58) Field of Classification Search
CPC ....... H04W 36/00837; H04W 36/0058; H04W 36/0061; H04W 76/20; H04W 36/36;
(Continued)

(56) References Cited

U.S. PATENT DOCUMENTS 9,253,704 B1    2/2016    Sarkar et al.
2018/0302827 A1*   10/2018   Mitsui .................. H04W 76/15
(Continued)

FOREIGN PATENT DOCUMENTS

| WO | 2016/046698 A1 | 3/2016 |
| WO | 2018170777 A1 | 9/2018 |
| WO | 2018172600 A1 | 9/2018 |

OTHER PUBLICATIONS

MediaTek Inc., "Signalling Overhead Reduction for Conditional Handover", 3GPP TSG-RAN WG2 Meeting #105, Feb. 25-Mar. 1, 2019, R2-1900144, 7 pages.
(Continued)

*Primary Examiner* — Phirin Sam
*Assistant Examiner* — Mang Boi Thawng

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In addition, the disclosure relates to a method performed by a source node in a wireless communication system, including the steps of: transmitting, to a target node, a handover request message including a conditional handover-related target cell identifier; receiving, from the target node, a handover request response message including a
(Continued)

handover command message having configuration information about a target cell for a conditional handover; and transmitting, to a terminal, a radio resource control (RRC) reconfiguration message including the handover command message and condition information for the conditional handover.

15 Claims, 16 Drawing Sheets

(51) Int. Cl.
 *H04W 36/30* (2009.01)
 *H04W 36/36* (2009.01)
 *H04W 76/20* (2018.01)
(52) U.S. Cl.
 CPC . *H04W 36/0064* (2023.05); *H04W 36/00838* (2023.05); *H04W 36/08* (2013.01); *H04W 36/302* (2023.05); *H04W 36/362* (2023.05)
(58) Field of Classification Search
 CPC . H04W 36/0055; H04W 36/08; H04W 16/28; H04W 36/0016; H04W 36/26; H04W 36/30
 See application file for complete search history.

(56) References Cited

U.S. PATENT DOCUMENTS

| | | | |
|---|---|---|---|
| 2019/0082396 A1 | 3/2019 | Maheshwari et al. | |
| 2019/0082481 A1 | 3/2019 | Ravishankar et al. | |
| 2020/0196205 A1* | 6/2020 | Kim | H04W 36/36 |
| 2020/0281038 A1* | 9/2020 | Fujishiro | H04W 36/305 |
| 2020/0336957 A1* | 10/2020 | Wu | H04W 36/0085 |
| 2020/0396652 A1* | 12/2020 | Decarreau | H04W 36/36 |
| 2020/0396660 A1* | 12/2020 | Wu | H04W 76/30 |
| 2021/0076266 A1* | 3/2021 | Wu | H04W 36/0072 |
| 2021/0120458 A1* | 4/2021 | Koskela | H04W 36/0016 |
| 2021/0400549 A1* | 12/2021 | Awada | H04W 36/18 |
| 2022/0014979 A1* | 1/2022 | Yiu | H04W 36/0085 |
| 2022/0014987 A1* | 1/2022 | Fujishiro | H04W 36/0079 |
| 2022/0053388 A1* | 2/2022 | Kim | H04W 76/27 |
| 2022/0078686 A1* | 3/2022 | Yiu | H04W 36/00 |
| 2022/0322175 A1* | 10/2022 | Liu | H04W 24/10 |
| 2024/0015626 A1* | 1/2024 | Chang | H04W 36/0072 |
| 2024/0172066 A1* | 5/2024 | Hong | H04W 36/0058 |

OTHER PUBLICATIONS

Nokia et al., "Basic details of Conditional Handover in E-UTRAN", 3GPP TSG-RAN WG2 Meeting #105, Feb. 25-Mar. 1, 2019, R2-1900613, 5 pages.
MediaTek Inc., "Discussions on Conditional Handover Procedures", 3GPP TSG-RAN WG2 Meeting #105, Feb. 25-Mar. 1, 2019, R2-1900143, 8 pages.
CATT, "Signalling Procedure of Conditional Handover", 3GPP TSG-RAN WG2 Meeting #105, Feb. 25-Mar. 1, 2019, R2-1900949, 4 pages.
International Search Report dated Jul. 2, 2020 in connection with International Patent Application No. PCT/KR2020/004170, 2 pages.
Written Opinion of the International Searching Authority dated Jul. 2, 2020 in connection with International Patent Application No. PCT/KR2020/004170, 4 pages.
Supplementary European Search Report dated Mar. 30, 2022, in connection with European Application No. 20778722.7, 9 pages.
Ericsson, "Inter-cell Handover in NR," R2-168730, 3GPP TSG-RAN WG2 Meeting #96, Reno, Nevada, USA, Nov. 14-18, 2016, 7 pages.
Ericsson, "Conditional Handover," R2-1803336 (resubmission of R2-1801329), 3GPP TSG-RAN WG2 #101, Athens, Greece, Feb. 26-Mar. 2, 2018, 6 pages.
Notification of the First Office Action dated Mar. 25, 2024, in connection with Chinese Application No. 202080024139.3, 13 pages.
Communication pursuant to Article 94(3) EPC dated Aug. 26, 2024, in connection with European Application No. 20778722.7, 1 pages.
Notification of the Second Office Action dated Nov. 28, 2024, in connection with Chinese Application No. 202080024139.3, 8 pages.

* cited by examiner

METHOD AND DEVICE FOR HANDOVER IN NEXT GENERATION MOBILE COMMUNICATION SYSTEM

CROSS-REFERENCE TO RELATED APPLICATIONS

This application is a 371 of International Application No. PCT/KR2020/004170 filed on Mar. 27, 2020, which claims priority to Korean Patent Application No. 10-2019-0035983 filed on Mar. 28, 2019, Korean Patent Application No. 10-2019-0036220 filed on Mar. 28, 2019, and Korean Patent Application No. 10-2020-0037139 filed on Mar. 26, 2020, the disclosures of which are herein incorporated by reference in their entirety.

BACKGROUND

1. Field

The disclosure relates to operations of a terminal and a base station in a mobile communication system. The disclosure relates to a method and device for handover in a next-generation mobile communication system. The disclosure relates to a handover command signal method and device for conditional handover in a next-generation mobile communication system. The disclosure relates to a method and device for performing beam-based handover in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the development of a wireless communication system, a method for controlling activation of multiple RLC layer devices in a system supporting a high-reliability low-delay service is required.

An embodiment of the disclosure is to provide a method and device for handover in a next-generation mobile communication system.

An embodiment of the disclosure is to propose a method for generating a conditional handover command transferred by a network in order to perform conditional handover, and signaling between a terminal and a network, and a source base station and a target base station, thereby proposing an inter-node signaling system capable of preventing destruction of node dependency that may occur when a source node directly transfers a handover condition to a terminal, and for signaling a success and a failure of each cell during multi-target cell handover. An embodiment of the disclosure is to provide a method and device for performing beam-based terminal autonomous handover in a wireless communication system.

An embodiment of the disclosure is to solve a problem of performing contention-based random access without performing contention-free random access if beam configuration information of a contention-free random access resource, which may be configured while a terminal is performing conditional handover, is highly likely to be changed from a moment of receiving a conditional handover command to a time point of performing the conditional handover.

SUMMARY

An embodiment of the disclosure may provide a method performed by a source node in a wireless communication system, the method comprising: transmitting, to a target node, a handover request message including a conditional handover-related target cell identifier; receiving, from the target node, a handover request response message which includes a handover command message including configuration information of a target cell for conditional handover; and transmitting, to a terminal, a radio resource control (RRC) reconfiguration message including the handover command message and condition information for the conditional handover.

An embodiment of the disclosure may provide a source node in a wireless communication system, the source node comprising a transceiver, wherein the source node is configured to transmit a handover request message including a conditional handover-related target cell identifier to a target node via the transceiver, receive, from the target node via the transceiver, a handover request response message which includes a handover command message including configuration information of a target cell for conditional handover, and control to transmit, to a terminal via the transceiver, a radio resource control (RRC) reconfiguration message including the handover command message and condition information for the conditional handover.

An embodiment of the disclosure may provide a method performed by a target node in a wireless communication system, the method comprising: receiving, from a source node, a handover request message including a conditional handover-related target cell identifier; and transmitting, to the source node, a handover request response message which includes a handover command message including configuration information of a target cell for conditional handover, wherein a radio resource control (RRC) reconfiguration message including the handover command message and condition information for the conditional handover is transmitted to a terminal from the source node.

An embodiment of the disclosure may provide a target node in a wireless communication system, the target node comprising: a transceiver; and a controller configured to receive, from a source node via the transceiver, a handover request message including a conditional handover-related target cell identifier, and control to transmit, to the source node via the transceiver, a handover request response message which includes a handover command message including configuration information of a target cell for conditional handover, wherein a radio resource control (RRC) reconfiguration message including the handover command message and condition information for the conditional handover are transmitted to a terminal from the source node.

An embodiment of the disclosure proposes a method of adding a conditional handover condition to a handover command, thereby improving performance or maintaining node dependency. An embodiment of the disclosure proposes an inter node message for signaling a handover configuration result value for target cells selected in a target node and a handover preparation request to a multi-target cell, thereby eliminating time and resource inefficiency caused by a repeated signal due to an existing signal system for a single target cell.

In an embodiment of the disclosure, a condition is generated based on beam-based intensity information that has not been considered in existing handover from among conditions of conditional handover, and is used with existing cell-based handover so as to cause conditional handover to be performed to a target cell which is capable of performing contention-free random access.

An embodiment of the disclosure can provide a method and device for handover in a next-generation mobile communication system. An embodiment of the disclosure can provide a handover command signal method and device for conditional handover in a next-generation mobile communication system.

Via the disclosure, when a conditional handover command is transferred to a terminal, a source base station can transfer, without decoding, a handover command message received from a target base station, thereby achieving time efficiency or reducing inter node signaling instead of destroying node dependency. When conditional handover is performed to a multi-target cell, time and resource efficiency is improved, via displaying of a cell capable of performing handover between a target node and a source node, in preparation for exchanging handover inter node message signaling to a single target cell.

According to an embodiment of the disclosure, beam-based handover can be efficiently performed in a wireless communication system.

According to an embodiment of the disclosure, when conditional handover in a next-generation mobile communication system is performed, handover can be performed to a target cell, which is capable of using contention-free random access that can be configured from a target base station when the conditional handover is performed, by adding or separately operating a beam intensity-based condition in addition to a cell intensity-based condition. When conditional handover is performed, a handover success probability can be increased by performing contention-free random access, and an additional procedure due to contention-based random access can be reduced.

DETAILED DESCRIPTION

Figure 1:
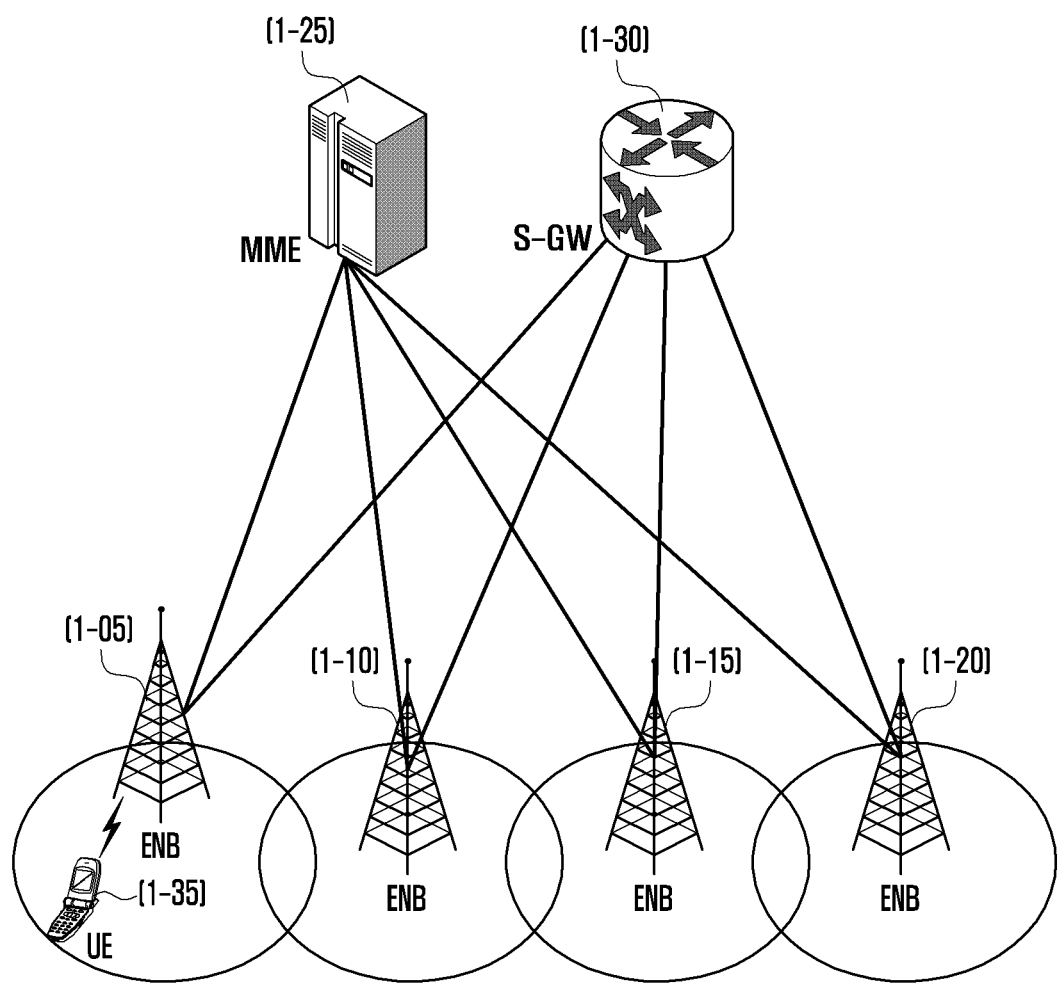
FIG. 1 is a diagram illustrating a structure of an LTE system according to an embodiment of the disclosure.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

FIG. 1 is a diagram illustrating a structure of an LTE system according to an embodiment of the disclosure.

Referring to FIG. 1, as illustrated, a radio access network in an LTE system may include a next generation base station (evolved node B, hereinafter, ENB, Node B, or base station) 1-05, 1-10, 1-15, and 1-20, a mobility management entity (MME) 1-25, and a serving-gateway (S-GW) 1-30. A user terminal (user equipment, hereinafter, UE or terminal) 1-35 may access an external network via the ENBs 1-05 to 1-20 and the S-GW 1-30.

In FIG. 1, the ENBs 1-05 to 1-20 may correspond to existing Node Bs of an UMTS system. The ENBs are connected to a UE 1-35 via a radio channel and may perform more complex roles compared to the existing Node Bs. In the LTE system, all user traffic including a real-time service, such as a voice over Internet protocol (VoIP) via the Internet protocol, may be serviced through a shared channel. Therefore, there is a need for a device which collects state information, such as buffer states, available transmission power states, and channel states of UEs, to perform scheduling, and the ENBs 1-05 to 1-20 may be in charge of this. A single ENB may typically control multiple cells. For example, in order to implement a transmission rate of 100 Mbps, the LTE system may use, for example, orthogonal frequency division multiplexing (OFDM) as a radio access technology in a 20 MHz bandwidth. Further, an adaptive modulation & coding (AMC) scheme that determines a modulation scheme and a channel coding rate according to a channel state of a terminal may be applied. The S-GW 1-30 is a device that provides a data bearer, and may generate or eliminate a data bearer under control of the MME 1-25. The MME is a device in charge of various control functions as well as a mobility management function for a terminal, and may be connected to multiple base stations.

Figure 2:
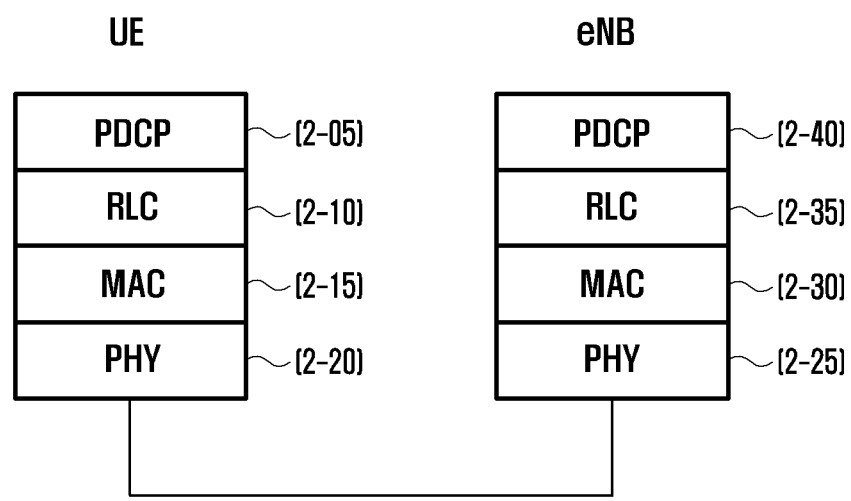
FIG. 2 is a diagram illustrating a radio protocol structure of the LTE system according to an embodiment of the disclosure.

FIG. 2 is a diagram illustrating a radio protocol structure of the LTE system according to an embodiment of the disclosure.

Referring to FIG. 2, the radio protocol of the LTE system may include, in a terminal and an ENB, packet data convergence protocols (PDCPs) 2-05 and 2-40, radio link controls (RLCs) 2-10 and 2-35, and medium access controls (MACs) 2-15 and 2-30, respectively. The PDCP may be in charge of an operation, such as IP header compression/restore. Main functions of the PDCPs may be summarized as follows.

Header compression and decompression function (header compression and decompression: ROHC only)
User data transmission function (transfer of user data)
In-sequence delivery function (in-sequence delivery of upper layer PDUs at PDCP re-establishment procedure for RLC AM)
Reordering function (for split bearers in DC (only support for RLC AM): PDCP PDU routing for transmission and PDCP PDU reordering for reception)
Duplicate detection function (duplicate detection of lower layer SDUs at PDCP re-establishment procedure for RLC AM)
Retransmission function (retransmission of PDCP SDUs at handover and, for split bearers in DC, of PDCP PDUs at PDCP data-recovery procedure, for RLC AM)
Encryption and decryption function (ciphering and deciphering)
Timer-based SDU discard function (timer-based SDU discard in uplink)

The radio link control (RLC) 2-10 and 2-35 may reconfigure a PDCP packet data unit (PDU) to an appropriate size so as to perform an ARQ operation or the like. Main functions of the RLCs are summarized as follows.

Data transmission function (transfer of upper layer PDUs)
ARQ function (error correction through ARQ (only for AM data transfer))
Concatenation, segmentation, and reassembly function (concatenation, segmentation and reassembly of RLC SDUs (only for UM and AM data transfer))
Re-segmentation function (re-segmentation of RLC data PDUs (only for AM data transfer))
reordering function (reordering of RLC data PDUs (only for UM and AM data transfer))
Duplicate detection function (duplicate detection (only for UM and AM data transfer))
Error detection function (protocol error detection (only for AM data transfer))
RLC SDU discard function (RLC SDU discard (only for UM and AM data transfer))
RLC re-establishment function (RLC re-establishment)

The MACs 2-15 and 2-30 may be connected to multiple RLC layer devices configured in one terminal, may multiplex RLC PDUs to MAC PDUs, and may demultiplex RLC PDUs from MAC PDUs. Main functions of the MACs are summarized as follows.

Mapping function (mapping between logical channels and transport channels)
Multiplexing and demultiplexing function (multiplexing/demultiplexing of MAC SDUs belonging to one or different logical channels into/from transport blocks (TB) delivered to/from the physical layer on transport channels)
Scheduling information reporting function (scheduling information reporting)
HARQ function (error correction through HARQ)
Function of priority handling between logical channels (priority handling between logical channels of one UE)
Function of priority handling between terminals (priority handling between UEs by means of dynamic scheduling)
MBMS service identification function (MBMS service identification)
Transmission format selection function (transport format selection)
Padding function (padding)

Figure 3:
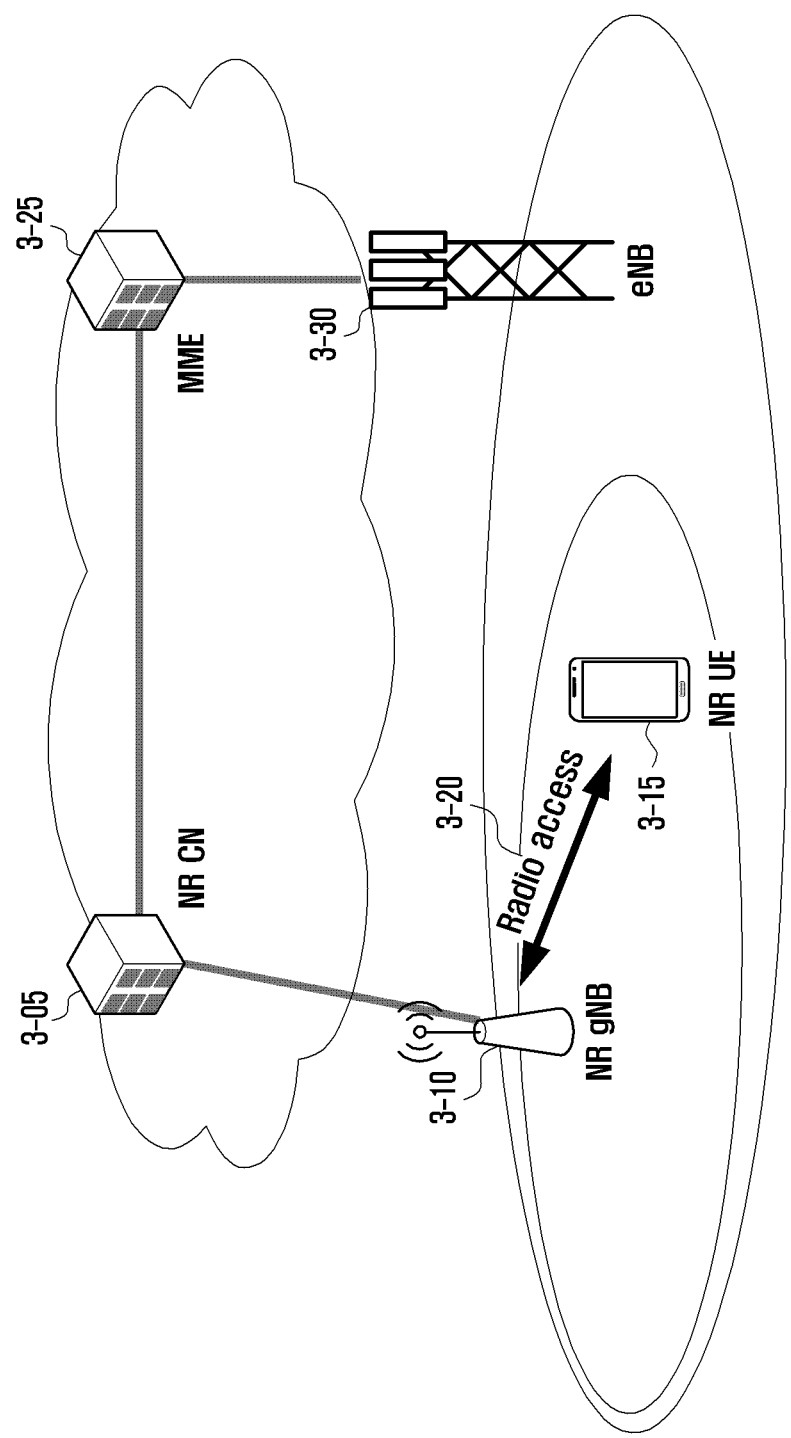
FIG. 3 is a diagram illustrating a structure of a next-generation mobile communication system according to an embodiment of the disclosure.

The NR PHY layers 2-20 and 2-25 may perform channel-coding and modulation of upper layer data, make the channel-coded and modulated upper layer data into OFDM symbols, and transmit the OFDM symbols via a radio channel, or may perform demodulation and channel-decoding of the OFDM symbols received via the radio channel and transfer the same to an upper layer. FIG. 3 is a diagram illustrating a structure of a next-generation mobile communication system according to an embodiment of the disclosure.

Referring to FIG. 3, a radio access network of the next-generation mobile communication system (hereinafter, NR or 2G) may include a next-generation base station (new radio node B, hereinafter, NR gNB or NR base station) 3-10 and a next-generation radio core network (new radio core network, NR CN) 3-05. A next-generation radio user terminal (new radio user equipment, NR UE or terminal) 3-15 may access an external network via an NR gNB 3-10 and an NR CN 3-05.

In FIG. 3, the NR gNB 3-10 may correspond to an evolved node B (eNB) of an existing LTE system. The NR gNB may be connected to the NR UE 3-15 via a radio channel and may provide a service superior to that of an existing Node B. In the next-generation mobile communication system, all user traffic may be serviced via a shared channel. Therefore, there is a need for a device which collects state information, such as buffer states, available transmission power states, and channel states of UEs, to perform scheduling, and the NR NB 3-10 may be in charge of this. A single NR gNB may control multiple cells. In the next-generation mobile communication system, in order to implement ultra-fast data transmission compared to the current LTE, a bandwidth greater than or equal to a current maximum bandwidth may be applied. A beam-forming technology may be additionally incorporated using orthogonal frequency division multiplexing (OFDM) as a radio access technology. Further, an adaptive modulation & coding (hereinafter, referred to as AMC) scheme that determines a modulation scheme and a channel coding rate according to a channel state of the terminal may be applied. The NR CN 3-05 may perform functions, such as mobility support, bearer configuration, and QoS configuration. The NR CN 3c-05 is a device in charge of various control functions as well as a mobility management function for the terminal, and may be connected to multiple base stations. The next generation mobile communication system may be linked to the existing LTE system, and the NR CN 3c-05 may be connected to an MME 3-25 via a network interface. The MME 3-25 may be connected to an eNB 3-30 that is an existing base station.

Figure 4:
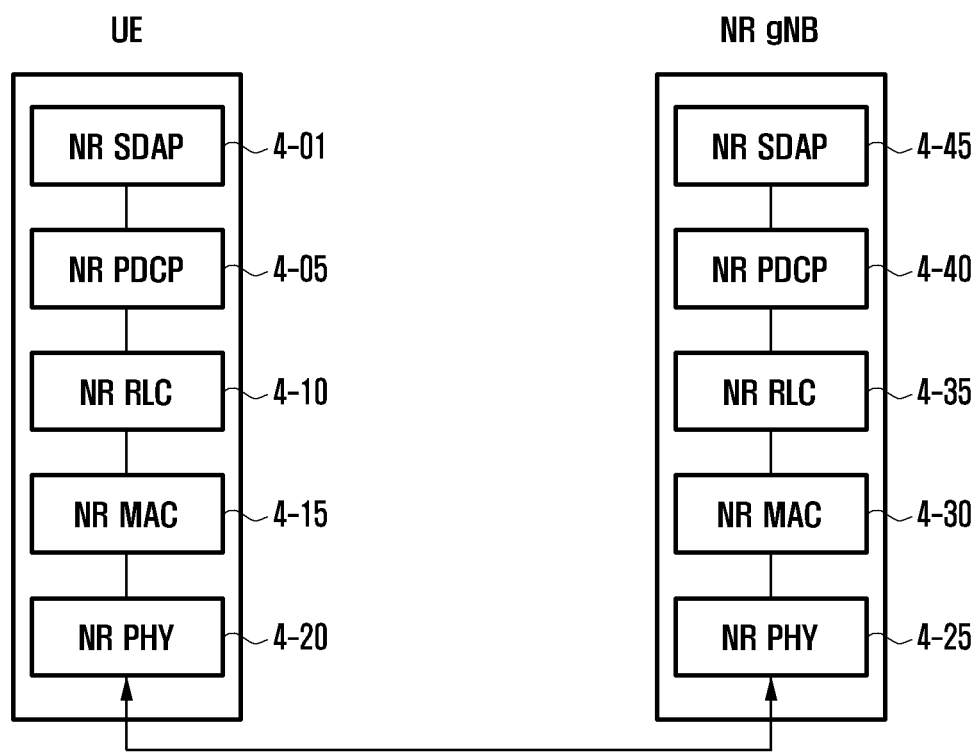
FIG. 4 is a diagram illustrating a radio protocol structure of the next-generation mobile communication system according to an embodiment of the disclosure.

FIG. 4 is a diagram illustrating a radio protocol structure of the next-generation mobile communication system according to an embodiment of the disclosure.

Referring to FIG. 4, a radio protocol of the next generation mobile communication system may include NR service data adaptation protocols (SDAPs) 4-01 and 4-45, NR PDCPs 4-05 and 4-40, NR RLCs 4-10 and 4-35, and NR MACS 4-15 and 4-30 in a terminal and an NR base station, respectively.

Main functions of the NR SDAPs 4-01 and 4-45 may include some of the following functions.
   User data transfer function (transfer of user plane data)
   Function of mapping QoS flow and data bearer for uplink and downlink (mapping between a QoS flow and a DRB for both DL and UL)
   Function of marking QoS flow ID in uplink and downlink (marking QoS flow ID in both DL and UL packets)
   Function of mapping reflective QoS flow to data bearer for uplink SDAP PDUs (reflective QoS flow to DRB mapping for the UL SDAP PDUs)

For an SDAP layer device, the terminal may be configured, via a radio resource control (RRC) message, whether to use a header of the SDAP layer device or use a function of the SDAP layer device for each PDCP layer device, for each bearer, or for each logical channel. When the SDAP header is configured, the terminal may perform indication using an access stratum (AS) QoS reflection configuration 1-bit indicator (AS reflective QoS) and a non-access stratum (NAS) quality of service (QoS) reflection configuration 1-bit indicator (NAS reflective QoS) of the SDAP header, so that the terminal updates or reconfigures mapping information on a QoS flow and a data bearer of uplink and downlink. The SDAP header may include QoS flow ID information indicating QoS. QoS information may be used as a data processing priority, scheduling information, etc. for supporting a smooth service.

Main functions of the NR PDCPs 4-05 and 4-40 may include some of the following functions.
   Header compression and decompression function (header compression and decompression: ROHC only)
   User data transmission function (transfer of user data)
   In-sequence delivery function (in-sequence delivery of upper layer PDUs)
   Out-of-sequence delivery function (out-of-sequence delivery of upper layer PDUs)
   Reordering function (PDCP PDU reordering for reception)
   Duplicate detection function (duplicate detection of lower layer SDUs)
   Retransmission function (retransmission of PDCP SDUs)
   Encryption and decryption function (ciphering and deciphering)
   Timer-based SDU discard function (timer-based SDU discard in uplink)

In the above description, the reordering function of an NR PDCP device may refer to a function of reordering PDCP PDUs received from a lower layer in order based on a PDCP sequence number (SN). The reordering function of the NR PDCP device may include a function of transferring data to an upper layer in a reordered order or include a function of directly transferring data without considering the order, and may include a function of performing reordering and recording lost PDCP PDUs, include a function of reporting states of the lost PDCP PDUs to a transmission side, and include a function of requesting retransmission of the lost PDCP PDUs.

Main functions of the NR RLCs 4-10 and 4-35 may include some of the following functions.
   Data transmission function (transfer of upper layer PDUs)
   In-sequence delivery function (in-sequence delivery of upper layer PDUs)
   Out-of-sequence delivery function (out-of-sequence delivery of upper layer PDUs)
   ARQ function (error correction through ARQ)
   Concatenation, segmentation, and reassembly function (concatenation, segmentation and reassembly of RLC SDUs)
   Re-segmentation function (re-segmentation of RLC data PDUs)
   Reordering function (reordering of RLC data PDUs)
   Duplicate detection function (duplicate detection)
   Error detection function (protocol error detection)
   RLC SDU discard function (RLC SDU discard)
   RLC re-establishment function (RLC re-establishment)

In the above description, the in-sequence delivery function of an NR RLC device may refer to a function of sequentially transferring, to an upper layer, RLC SDUs received from a lower layer. When an original one RLC SDU is divided into multiple RLC SDUs and then received, the in-sequence delivery function of the NR RLC device may include a function of reassembling and then transferring the RLC SDUs.

The in-sequence delivery function of the NR RLC device may include a function of reordering the received RLC PDUs according to an RLC sequence number (SN) or a PDCP sequence number (SN), may include a function of reordering and recording lost RLC PDUs, may include a function of reporting states of the lost RLC PDUs to a transmission side, and may include a function of requesting retransmission for the lost RLC PDUs.

The in-sequence delivery function of the NR RLC device may include a function of, when a lost RLC SDU exists, sequentially transferring, to the upper layer, only RLC SDUs before the lost RLC SDU.

The in-sequence delivery function of the NR RLC device may include a function of, if a predetermined timer expires, sequentially transferring all RLC SDUs, which are received before the timer starts, to the upper layer even if a lost RLC SDU exists.

The in-sequence delivery function of the NR RLC device may include a function of, if the predetermined timer expires, sequentially transferring all RLC SDUs, which have been received so far, to the upper layer even if a lost RLC SDU exists.

The NR RLC device may process RLC PDUs in the order of receiving the RLC PDUs regardless of the order of sequence numbers (out-of-sequence delivery) and may transfer the processed RLC PDUs to the NR PDCP device.

When the NR RLC device receives a segment, the NR RLC device may receive segments which are stored in a buffer or will be received at a later time, may perform reconfiguration into one complete RLC PDU, and then may transmit the same to the NR PDCP device.

An NR RLC layer may not include a concatenation function, and the function may be performed in an NR MAC layer or may be replaced with a multiplexing function of the NR MAC layer.

In the above description, the out-of-sequence delivery function of the NR RLC device may refer to a function of directly transferring RLC SDUs received from a lower layer, to the upper layer regardless of order. The out-of-sequence delivery function of the NR RLC device may include a function of, when an original one RLC SDU is divided into multiple RLC SDUs and then received, reassembling and then transferring the RLC SDUs. The out-of-sequence delivery function of the NR RLC device may include a function of storing an RLC SN or PDCP SN of the received RLC PDUs, performing reordering, and recording lost RLC PDUs.

The NR MACs 4-15 and 4-30 may be connected to multiple NR RLC layer devices included in one terminal, and main functions of the NR MACs may include some of the following functions.\

Mapping function (mapping between logical channels and transport channels)

Multiplexing and demultiplexing function (multiplexing/demultiplexing of MAC SDUs)

Scheduling information reporting function (scheduling information reporting)

HARQ function (error correction through HARQ)

Function of priority handling between logical channels (priority handling between logical channels of one UE)

Function of priority handling between terminals (priority handling between UEs by means of dynamic scheduling)

MBMS service identification function (MBMS service identification)

Transmission format selection function (transport format selection)

Padding function (padding)

The NR PHY layers 4-20 and 4-25 may perform channel-coding and modulation of upper layer data, make the channel-coded and modulated upper layer data into OFDM symbols, and transmit the OFDM symbols via a radio channel, or may perform demodulation and channel-decoding of the OFDM symbols received via a radio channel and transfer the same to the upper layer.

Figure 5:
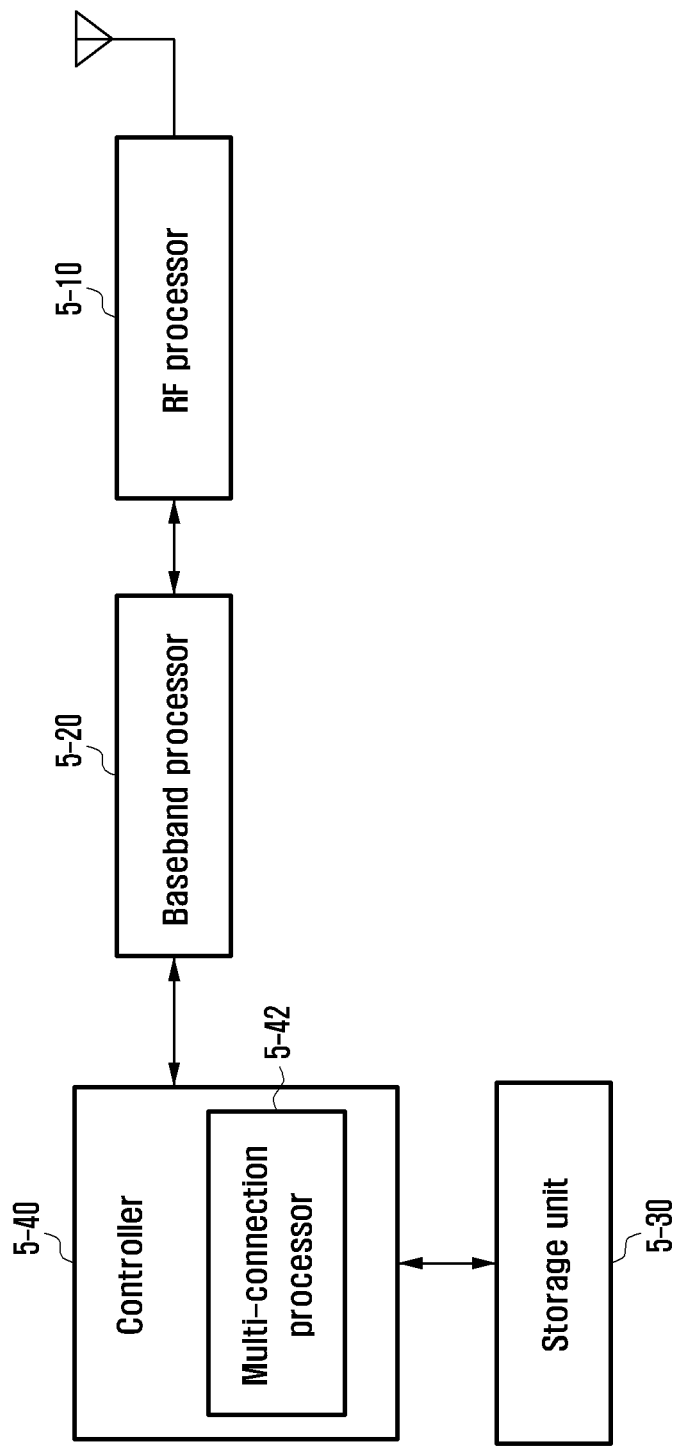
FIG. 5 is a diagram illustrating a configuration of a terminal according to an embodiment of the disclosure.

FIG. 5 is a diagram illustrating a configuration of a terminal according to an embodiment of the disclosure.

Referring to FIG. 5, the terminal may include a radio frequency (RF) processor 5-10, a baseband processor 5-20, a storage unit 5-30, and a controller 5-40. The controller 5-40 may further include a multi-connection processor 5-42.

The RF processor 5-10 may perform a function for transmitting or receiving a signal via a radio channel, such as signal band transform and signal amplification. That is, the RF processor 5-10 may up-convert a baseband signal provided from the baseband processor 5-20 into an RF band signal, may transmit the up-converted RF band signal via an antenna, and then may down-convert the RF band signal received via the antenna into a baseband signal. For example, the RF processor 5-10 may include a transmission filter, a reception filter, an amplifier, a mixer, an oscillator, a digital-to-analog convertor (DAC), an analog-to-digital convertor (ADC), and the like. In the drawing, only one antenna is illustrated, but the terminal may have multiple antennas. The RF processor 5-10 may include multiple RF chains. Furthermore, the RF processor 5-10 may perform beamforming. For the beamforming, the RF processor 5-10 may adjust a phase and a magnitude of each of signals transmitted or received via multiple antennas or antenna elements. The RF processor may perform MIMO, and may receive multiple layers when performing MIMO operations.

The baseband processor 5-20 performs conversion between a baseband signal and a bitstream according to a physical layer specification of the system. For example, during data transmission, the baseband processor 5-20 generates complex symbols by encoding and modulating a transmission bitstream. When data is received, the baseband processor 5-20 reconstructs a reception bitstream via demodulation and decoding of the baseband signal provided from the RF processor 5-10. For example, in a case of conforming to an orthogonal frequency division multiplexing (OFDM) scheme, during data transmission, the baseband processor 5-20 generates complex symbols by encoding and modulating a transmission bitstream, maps the complex symbols to sub-carriers, and then configures OFDM symbols via an inverse fast Fourier transform (IFFT) operation and cyclic prefix (CP) insertion. Further, during data reception, the baseband processor 5-20 divides the baseband signal provided from the RF processor 5-10 in units of OFDM symbols, reconstructs the signals mapped to the sub-carriers via fast Fourier transform (FFT), and then reconstructs the reception bitstream via demodulation and decoding.

The baseband processor 5-20 and the RF processor 5-10 transmit and receive signals as described above. Accordingly, the baseband processor 5-20 and the RF processor 5-10 may be referred to as a transmitter, a receiver, a transceiver, a transceiving device, or a communication unit. Moreover, at least one of the baseband processor 5-20 and the RF processor 5-10 may include multiple communication modules to support multiple different radio access technologies. At least one of the baseband processor 5-20 and the RF processor 5-10 may include different communication modules to process signals in different frequency bands. For example, the different radio access technologies may include a wireless LAN (e.g., IEEE 802.11), a cellular network (e.g., LTE), and the like. The different frequency bands may include a super high frequency (SHF) (e.g., 2 NRHz, NRhz) band and a millimeter wave (e.g., 60 GHz) band.

The storage unit 5-30 stores data, such as a default program, an application program, and configuration information, for operation of the terminal. Particularly, the storage unit 5-30 may store information related to a second access node that performs radio communication by using a second radio access technology. The storage unit 5-30 provides stored data in response to a request of the controller 5-40.

The controller 5-40 controls overall operations of the terminal. For example, the controller 5-40 transmits or receives a signal via the baseband processor 5-20 and the RF processor 5-10. The controller 5-40 records and reads data in the storage unit 5-30. To this end, the controller 5-40 may include at least one processor. For example, the controller 5-40 may include a communication processor (CP) configured to perform control for communication and an application processor (AP) configured to control an upper layer, such as an application program. According to an embodiment of the disclosure, the controller 5-40 may transmit a handover request message including a conditional handover-related target cell identifier to a target node via the transceiver, may receive, from the target node via the transceiver, a handover request response message which includes a handover command message including configuration information of a target cell for conditional handover, and may control to transmit, to the terminal via the transceiver, a radio resource control (RRC) reconfiguration message including the handover command message and condition information for the conditional handover.

The condition information may be determined by the source node. The handover command message may be transferred via an RRC container, and the source may not modify the configuration information of the target cell included in the handover command message. The handover request response message may include cell identification information of the target cell for the conditional handover, and the handover command message may include a delta configuration based on source configuration information. The RRC reconfiguration message may include information for one or multiple cells for the conditional handover, and the condition information may be configured based on a measurement identifier (measurement identity) including a measurement object and a report configuration.

Figure 6:
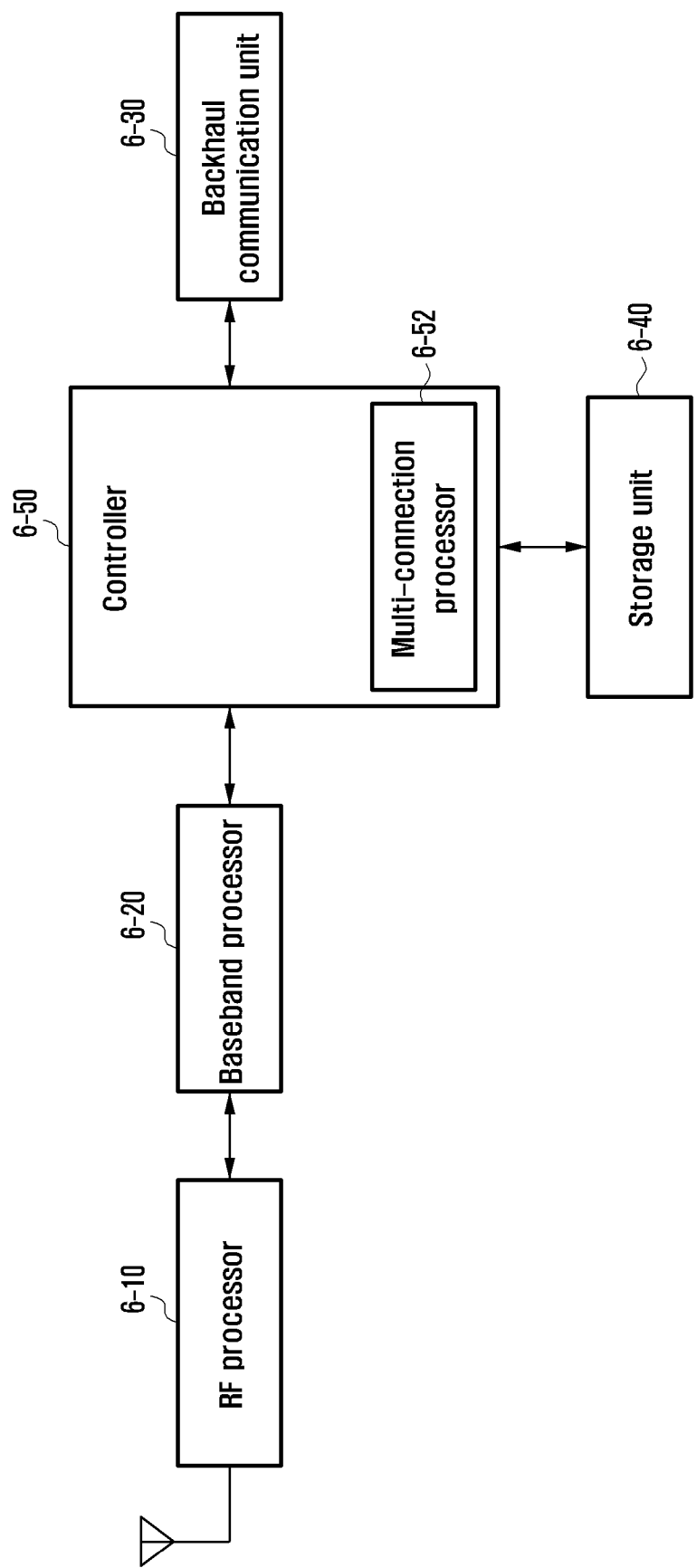
FIG. 6 is a diagram illustrating a configuration of a base station according to an embodiment of the disclosure.

FIG. 6 is a diagram illustrating a configuration of a base station according to an embodiment of the disclosure.

Referring to FIG. 6, the base station may include an RF processor 6-10, a baseband processor 6-20, a backhaul communication unit 6-30, a storage unit 6-40, and a controller 6-50. The controller 6-50 may further include a multi-connection processor 6-52. The base station may be an NR base station.

The RF processor 6-10 may perform a function for transmitting or receiving a signal via a radio channel, such as signal band transform and signal amplification. That is, the RF processor 6-10 may up-convert a baseband signal provided from the baseband processor 6-20 into an RF band signal, may transmit the up-converted RF band signal via an antenna, and then may down-convert the RF band signal received via the antenna into a baseband signal. For example, the RF processor 6-10 may include a transmission filter, a reception filter, an amplifier, a mixer, an oscillator, a DAC, an ADC, and the like. In the drawing, only one antenna is illustrated, but a first access node may include multiple antennas. The RF processor 6-10 may include multiple RF chains. Furthermore, the RF processor 6-10 may perform beamforming. For the beamforming, the RF processor 6-10 may adjust a phase and a magnitude of each of signals transmitted or received via the multiple antennas or antenna elements. The RF processor may perform downlink MIMO by transmitting one or more layers.

The baseband processor 6-20 performs a function of conversion between a baseband signal and a bitstream according to a physical layer specification of a first radio access technology. For example, during data transmission, the baseband processor 6-20 generates complex symbols by encoding and modulating a transmission bitstream. When data is received, the baseband processor 6-20 reconstructs a reception bitstream via demodulation and decoding of the baseband signal provided from the RF processor 6-10. For example, in a case of conforming to an OFDM scheme, during data transmission, the baseband processor 6-20 generates complex symbols by encoding and modulating a transmission bitstream, maps the complex symbols to subcarriers, and then configures OFDM symbols via an IFFT operation and CP insertion. Further, during data reception, the baseband processor 6-20 divides the baseband signal provided from the RF processor 6-10 in units of OFDM symbols, reconstructs the signals mapped to the sub-carriers via an FFT operation, and then reconstructs the reception bitstream via demodulation and decoding. The baseband processor 6-20 and the RF processor 6-10 transmit and receive signals as described above. Accordingly, the baseband processor 6-20 and the RF processor 6-10 may be referred to as a transmitter, a receiver, a transceiver, a transceiving device, a communication unit, or a radio communication unit.

The backhaul communication unit 6-30 provides an interface to perform communication with other nodes within a network. That is, the backhaul communication unit 6-30 converts, into a physical signal, a bitstream transmitted from the main base station to another node, for example, an auxiliary base station and a core network, and converts a physical signal received from the another node into a bitstream.

The storage unit 6-40 stores data, such as a default program, an application program, and configuration information, for operation of the main base station. In particular, the storage unit 6-40 may store information on a bearer assigned to a connected terminal, a measurement result reported from the connected terminal, and the like. The storage unit 6-40 may store information serving as a criterion for determining whether to provide the terminal with multi-connectivity or to suspend multi-connectivity. The storage unit 6-40 provides stored data in response to a request of the controller 6-50.

The controller 6-50 controls overall operations of the main base station. For example, the controller 6-50 transmits or receives a signal via the baseband processor 6-20 and the RF processor 6-10 or via the backhaul communication unit 6-30. The controller 6-50 records and reads data in the storage unit 6-40. To this end, the controller 6-50 may include at least one processor.

According to an embodiment of the disclosure, the controller 6-50 may control to receive a handover request message including a conditional handover-related target cell identifier from a source node via the transceiver, and to transmit a handover request response message, which includes a handover command message including configuration information of a target cell for conditional handover, to the source node via the transceiver.

A radio resource control (RRC) reconfiguration message including the handover command message and condition information for the conditional handover may be transmitted from the source node to the terminal. The condition information may be determined by the source node. The handover command message may be transferred via an RRC container, and the configuration information of the target cell included in the handover command message may not be modified in the source node. The handover request response message may include cell identification information of the target cell for the conditional handover, and the handover command message may include a delta configuration based on source configuration information. The RRC reconfiguration message may include information for one or multiple cells for the conditional handover, and the condition information may be configured based on a measurement identifier (measurement identity) including a measurement object and a report configuration.

First Embodiment

Figure 7:
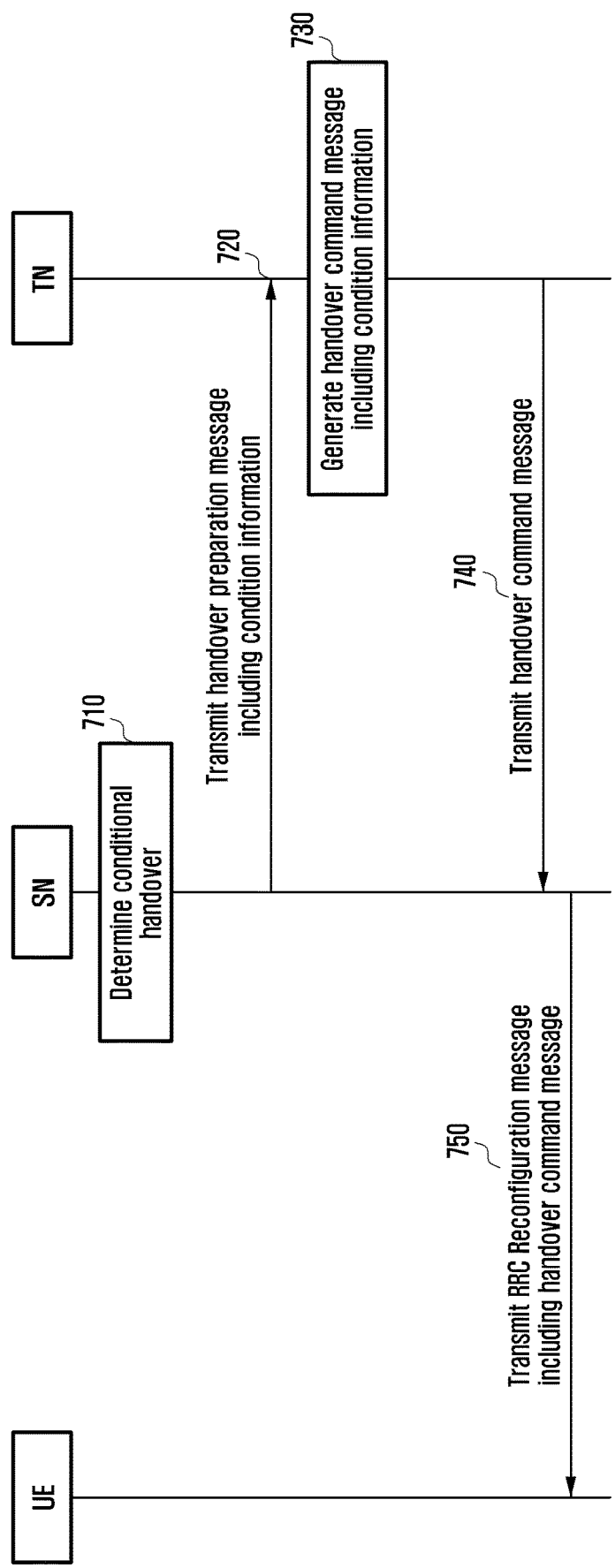
FIG. 7 is a diagram illustrating a procedure of determining conditional handover and then transferring a condition to a corresponding target node by a source node, and generating a handover command by the target node, according to an embodiment of the disclosure.

FIG. 7 is a diagram illustrating a procedure of determining conditional handover and then transferring a condition to a corresponding target node by a source node, and generating a handover command by the target node, according to an embodiment of the disclosure. In this case, along with a condition, a resource configuration effective time may also be transferred to a corresponding target cell, and may be added to a conditional handover command so as to be transmitted to a terminal.

Referring to FIG. 7, a communication system may include a terminal (UE), a source node (SN), and a target node (TN). The source node may determine conditional handover (CHO) in 710. After the source node determines conditional handover, the source node determines a corresponding target cell and transfers an HO preparation inter node message to a target node operating the target cell, in 720. The source node may transfer condition information, which is to be applied to each target cell, included in the message. The HO preparation inter node message may be a handover request message.

The target node finally determines a candidate target cell in consideration of handover applicability with respect to target cells given from the source node, and generates a handover command message with a configuration value to be applied during handover in the corresponding cells, in 730. For each candidate target cell, handover execution condition information that has been transferred to the source base station may be added. Alternatively, if necessary, information that modifies this condition may be added.

This handover command message may be transferred via a handover request ack message that is an Xn message, in 740. The handover command message is one RRC message and may be included in the Xn message in a form of octet string so as to be transferred to the source node. Configuration information in the target cell, which may be included in the handover command message, may include CFRA resources (e.g., for all wide/cell specific beams, and given delay between CHO configuration and execution), PCell (dedicated and common) configuration, T304 (to guard actual CHO execution phase i.e., started after condition is met), radioBearerConfig, RLC bearerConfig, MAC config, measConfig, etc., and these may be included as a container for each target cell within one conditional handover, or a conditional handover command may be generated for each target cell and corresponding information may be included therein. This information is applicable to all cases of FIG. 7, FIG. 8, FIG. 9, FIG. 10, and FIG. 11.

This (conditional) handover command message is a delta signal based on source configuration information of the terminal at the moment when the command message is transferred to the terminal. Therefore, at a point in time when the terminal receives the handover command, newly added information may be used in the target cell, wherein the newly added information is obtained by overwriting, erasing, or changing contents contained in a conditional handover command message in comparison to current configuration information of the terminal itself. In another embodiment, for each target cell, the handover command message may be a delta signal based on the conditional handover configuration information of the target cell, which has been previously transferred to the terminal. In this case, for a specific target cell, the terminal always updates the configuration information for the target cell by overwriting newly received configuration information on the basis of previously received configuration information, or by erasing or replacing the previous configuration information. This operation is also applicable to all cases of FIG. 7, FIG. 8, FIG. 9, FIG. 10, and FIG. 11.

If each octet string is generated for multiple cells, a specific factor in each octet string may have the same value for each cell, and in this case, for the convenience of a signal, a specific factor may have an indication that the specific factor is the same as another factor in an octet string list entry. A specific factor of a specific target cell, which has this indication, may refer to a value of a corresponding factor of another cell in an octet string list.

The source node may transfer, as it is without separate decoding, a handover command message of the octet string, which is received from the target node, as an RRC reconfiguration message to the terminal, in 750. The RRC reconfiguration message may include dedicated resource configuration information of each candidate target cell and condition information that is a basis for determining execution of the conditional handover. The terminal having received the message starts measurement according to an added condition, and determines whether the condition is satisfied. If this condition is satisfied, the terminal performs conditional handover to a target cell that satisfies the condition.

Figure 8:
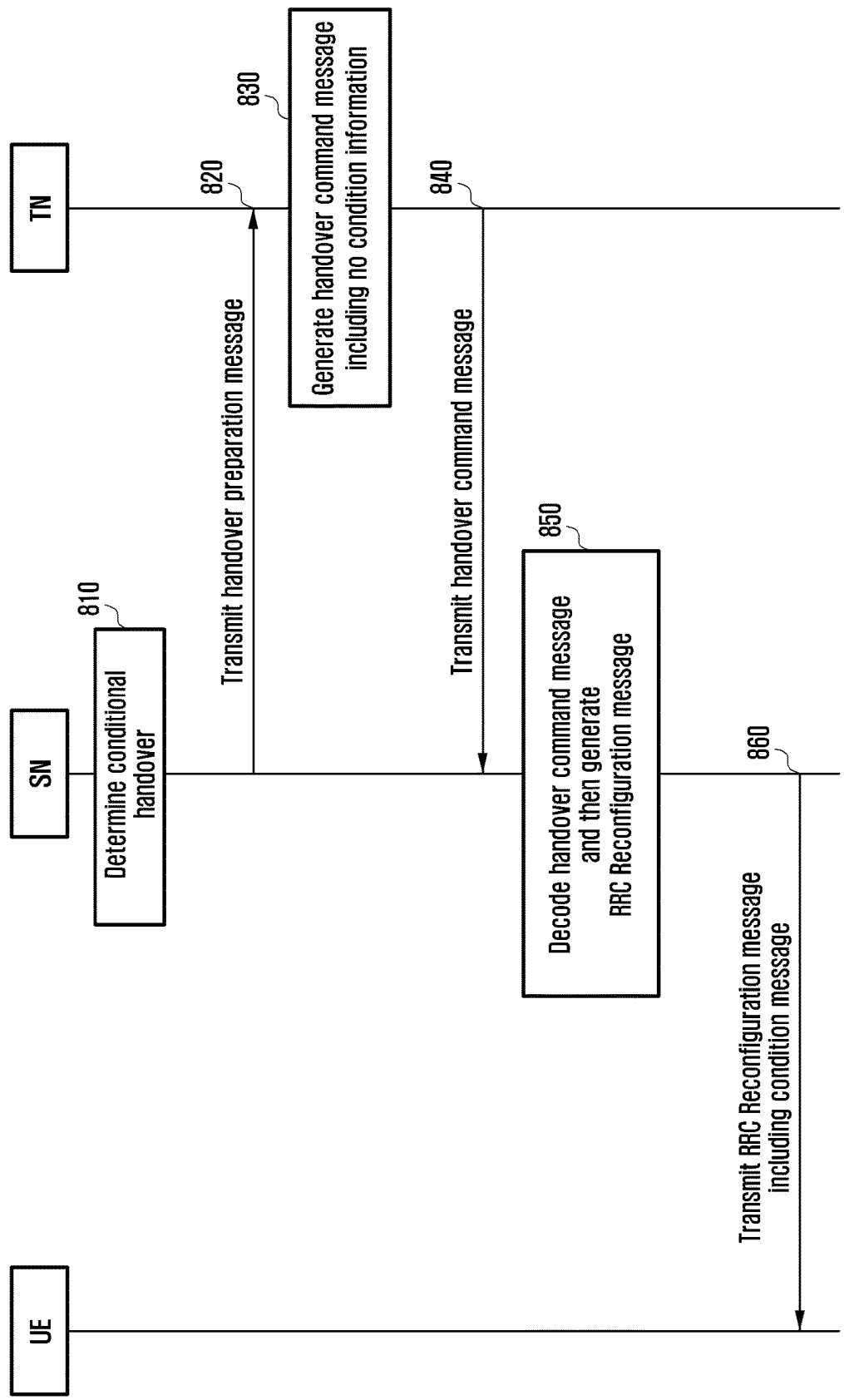
FIG. 8 is a diagram illustrating a procedure of directly transferring a condition for conditional handover, to a terminal by a source node, according to an embodiment of the disclosure.

FIG. 8 is a diagram illustrating a procedure of directly transferring a condition for conditional handover, to a terminal by a source node, according to an embodiment of the disclosure. In this case, along with a condition, a resource configuration effective time may be also transferred to a corresponding target cell, and may be directly transferred to a terminal. Referring to FIG. 8, a communication system may include a terminal (UE), a source node (SN), and a target node (TN). The source node may determine conditional handover (CHO) in 810. After the source node determines conditional handover, the source node determines a corresponding target cell and transfers an HO preparation inter node message to a target node operating the target cell, in 820. The source node does not transfer condition information, which is to be applied to each target cell, included in the message.

The target node finally determines a candidate target cell in consideration of handover applicability with respect to target cells given from the source node, and generates a handover command message with a configuration value to be applied during handover in the corresponding cells, in 830. This handover command message may be transferred via a handover request ack message that is an Xn message, in 840. The handover command message is one RRC message and may be included in the Xn message in a form of an octet string so as to be transferred to the source node.

The source node may decode the handover command message of the octet string received from the target node, to check each target cell, and may add a condition for conditional handover to the corresponding target cell for each cell, in 850. The source node adds the condition for conditional handover for each cell, and then, via performing encoding, transfers the condition in an RRC Reconfiguration message back to the terminal, in 860. The RRC reconfiguration message may include dedicated resource configuration information of each candidate target cell and condition information that is a basis for determining execution of the conditional handover. The terminal having received the RRC reconfiguration message starts measurement according to an added condition, and determines whether the condition is satisfied. If this condition is satisfied, the terminal may perform conditional handover to a target cell that satisfies the condition. In various embodiments of the disclosure, it has been described that the source node transmits an RRC reconfiguration message to the terminal, but this corresponds to an example of an RRC message, and other RRC messages may be used. When a radio access technology (RAT) of a source node of the disclosure is LTE, the RRC message may be an RRC connection reconfiguration message.

Figure 9:
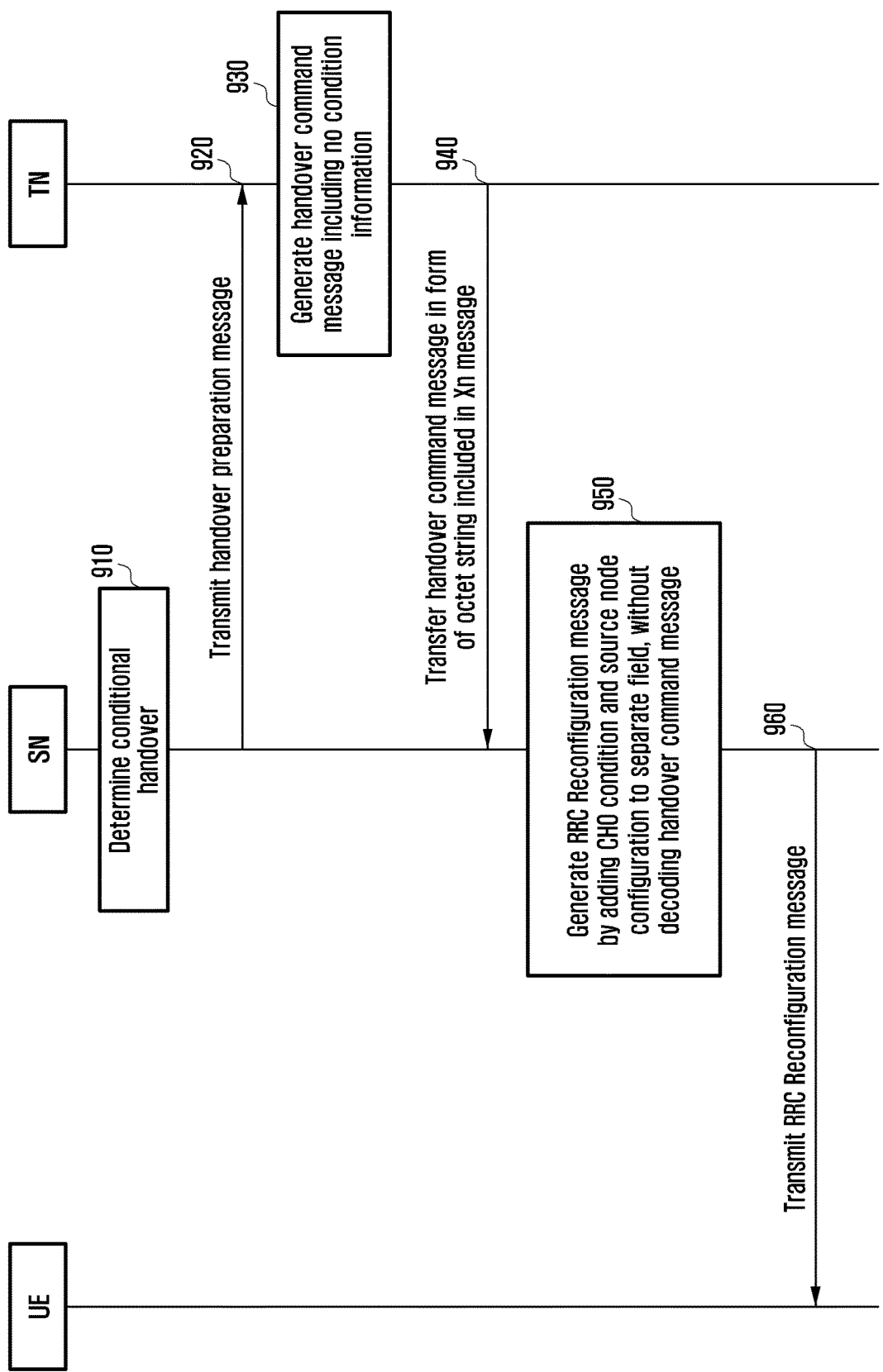
FIG. 9 is a diagram illustrating an operation of additionally adding, by a source node, control information for the source node to a conditional handover command generated from a target node, according to an embodiment of the disclosure.

FIG. 9 is a diagram illustrating an operation of additionally adding, by a source node, control information for the source node to a conditional handover command generated from a target node, according to an embodiment of the disclosure. In this case, along with a condition, a resource configuration effective time may also be transferred to a corresponding target cell, and may be added to a conditional handover command, or may be added to a separate field by the source node so as to be transmitted to a terminal.

Referring to FIG. 9, a communication system may include a terminal (UE), a source node (SN), and a target node (TN). The source node may determine conditional handover (CHO) in 910. After the source node determines conditional handover, the source node determines a corresponding target cell and transfers an HO preparation inter node message to a target node operating the target cell, in 920. The HO preparation inter node message may be a handover request message. The source node does not transfer condition information, which is to be applied to each target cell, included in this message.

The target node finally determines, with respect to target cells given from the source node, a candidate target cell in consideration of handover applicability, and generates a handover command message with a configuration value to be applied during handover in the corresponding cells, in 930. The handover command message is transferred via a handover request ack message that is an Xn message, in 940. The handover command message is an RRC message and may be included in the Xn message in a form of an octet string so as to be transferred to the source node. Here, in a case of multiple target cells, the handover command message may be included in the Xn message in a form of an octet string list.

The source node may add information controlled by the source node to a separate field, which is separate from the handover command message of the octet string received from the target node, in 950. In this procedure, the octet string received from the target cell is not decoded, and a condition for performing conditional handover and other information for controlling the terminal by the source node are added to the separate field. Since the octet string is not decoded, the source node does not modify the handover command message received from the target node or information included in the handover command message. Information that may be added to the separate field may be information requiring reconfiguration in the current source cell or common condition information for all or some group target cells, rather than a configuration of conditional handover. Alternatively, the source node may transfer, to the target node, the condition for conditional handover, and the target node may generate a conditional handover command including the condition, and make the same into an octet string so as to transfer the octet string back to the source node. In this case, the aforementioned separate field for information controlled by the source node may not include the condition of conditional handover, and configuration information for terminal configuration in the current source node may be included.

The source node transfers, after encoding procedure, the field as an information element separate from the octet string to the terminal by a single integrated RRC reconfiguration message, in 960. This RRC reconfiguration message may include dedicated resource configuration information of a candidate target cell of each or specific group, condition information that is a basis for determining to perform conditional handover, and terminal configuration information required in the current source cell, which is unrelated to conditional handover. The terminal having received the message applies terminal configuration required in the source cell, and updates and stores configuration information in the target cell for conditional handover. Measurement according to the added condition for conditional handover may be started, and whether the condition is satisfied may be determined. If the condition is satisfied the terminal may perform conditional handover to a target cell that satisfies the condition.

Table 1 below shows an example of an ASN.1 code of an RRCReconfiguration message generated in this manner.

TABLE 1

RRCReconfig msg ::= seq{ sn_Control_part SN_control, tn_HO_CMD octect string{Handover Command},}

SN_control is terminal control information added separately by the source node, and may include condition information for handover. tn_HO_CMD is a handover command octet string for conditional handover, which is received from the target node. In all the embodiments of FIG. 7, FIG. 8, and FIG. 9, multiple target cells for conditional handover are requested from one target node, wherein CGI for multiple target cells should be added to a target cell global ID field of a HANDOVER REQUEST message transferred to an Xn interface. Table 2 below shows contents of the target cell global ID field in the HANDOVER REQUEST message. Multiple pieces of global CGI information of each target cell, which uses a current target node ID and an id of a target cell operated in the target node, may be added to the target cell global ID field. The handover request message may include conditional handover information or conditional handover indication information.

TABLE 2

| IE/Group Name | Presence | Range | IE type and reference | semantics description | Criticality | Assigned Criticality |
| --- | --- | --- | --- | --- | --- | --- |
| Target Cell Global ID | M | | 9.2.3.25 | includes either an E-UTRA CGI or an NR CGI | YES | reject |

Figure 10:
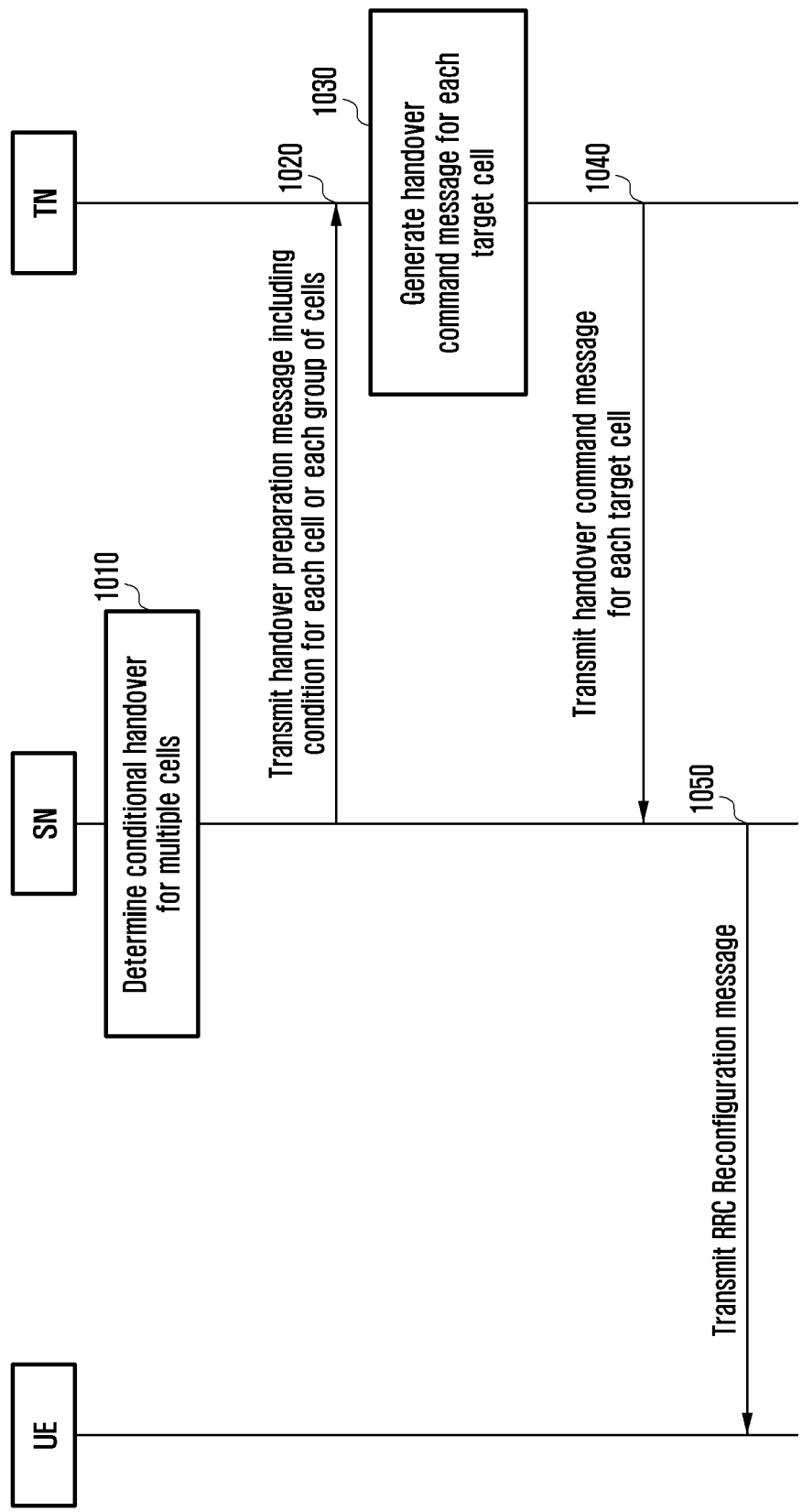
FIG. 10 is a diagram illustrating an operation of, when a source node prepares conditional handover for a multi-cell, adding a multi-cell to one conditional handover command, according to an embodiment of the disclosure.

The target node having received the message may perform admission control and dedicated resource allocation for each target cell. FIG. 10 is a diagram illustrating an operation of adding multiple cells to one conditional handover command when a source node prepares conditional handover for multiple cells according to an embodiment of the disclosure.

Referring to FIG. 10, a communication system may include a terminal (UE), a source node (SN), and a target node (TN). The source node may determine conditional handover (CHO) in 1010. The source node may request the target node to prepare handover for multiple target cells, in 1020. The source node may transmit, to the target node, a handover preparation message (handover preparation INM message) including a condition for each cell or group of cells.

When the target node generates a handover command for a target cell, the target node may generate handover commands for respective target cells, instead of generating one handover command, in 1030. Each handover command is one octet string, and may be included as a separate octet string in a HANDOVER REQUEST ACKNOWLEDGE message transmitted from the target node to the source node, in 1040. Accordingly, a target NG-GAN node to Source NG-RAN node Transparent container field below may have a separate octet string on the basis of target cell global IDs or indices of candidate target cells determined in each target node. To this end, a target cell CGI list or an index list of the determined target cells may be added to the HANDOVER REQUEST ACKNOWLEDGE message, and a transparent container field below may include multiple octet strings in the order of a corresponding list.

information on multiple target cells is included in the handover command message, but is expressed as one octet string, so that a target cell selected as a candidate target cell cannot be unknown in a HANDOVER REQUEST ACKNOWLEDGE Xn message.

The target node may transmit, to the source node, an Xn message carrying the handover command message expressed as a single octet string, in 1140. The source node transfers, without decoding, an RRC Reconfiguration message including this handover command message to the terminal, in 1150.

Figure 12:
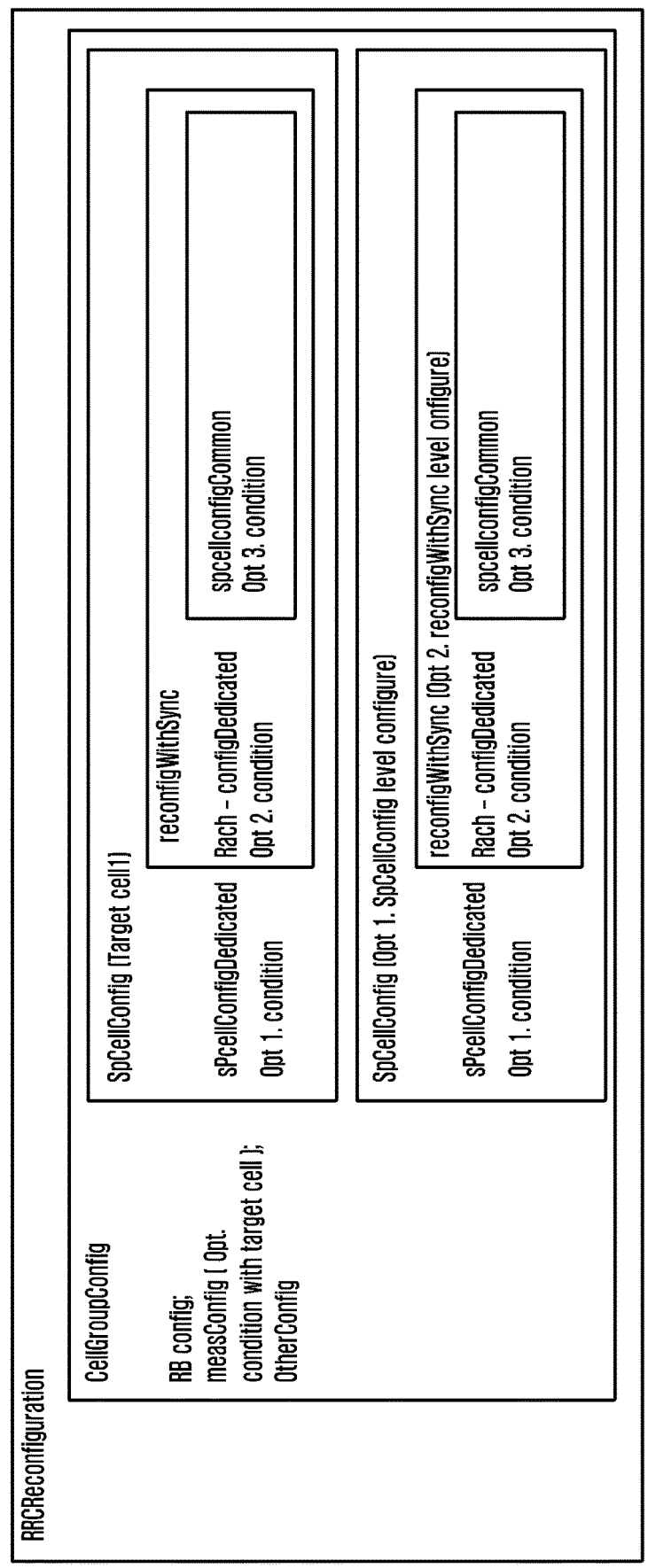
FIG. 12 is a diagram illustrating an operation relating to determining a field in RRC reconfiguration information, to which multi-target cell information is to be added, according to an embodiment of the disclosure.

FIG. 12 is a diagram illustrating an operation relating to determining a field in RRC reconfiguration information, to which multi-target cell information is to be added, according to an embodiment of the disclosure.

Referring to FIG. 12, when one handover command message is included in an RRC Reconfiguration message given to a terminal, if this message includes information on multiple candidate target cells, options for a detailed location for configuration of a condition may be provided. A first option is that a handover command message is included in SpcellConfig IE, but is located outside reconfigWithSync. A second option is that a handover command message is

TABLE 3

| IE/Group Name | Presence | Range | IE type and reference | Semantics description | Criticality | Assigned Criticality |
|---|---|---|---|---|---|---|
| Target NG-RAN node To Source NG-RAN node Transparent Container | M | | OCTET STRING | Either includes the HandoverCommand message as defined in subclause 10.2.2 of TS 36.331 [14], if the target NG-RAN node is an ng-eNB, or the HandoverCommand message as defined in subclause 11.2.2 of TS 38.331 [10], if the target NG-RAN node is a gNB. | YES | ignore |

In this case, the condition for each target cell may be included in each handover command. The source node may generate an RRC reconfiguration message including each handover command received from the target node, so as to transmit the generated RRC reconfiguration message to the terminal, in 1050. The source node does not need to decode the handover command received from the target node.

Figure 11:
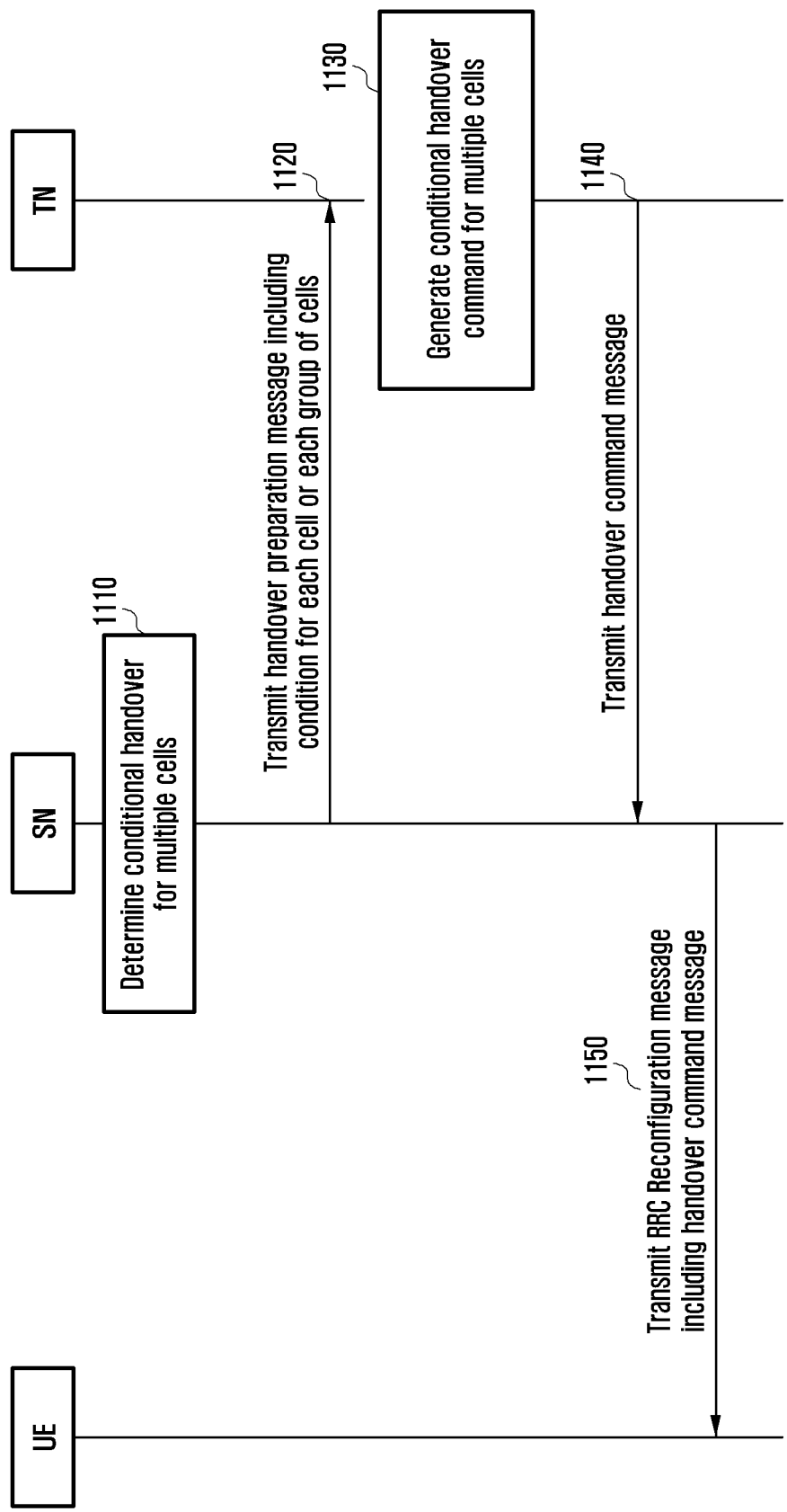
FIG. 11 is a diagram illustrating an operation of, when a source node prepares conditional handover for a multi-cell, adding one cell to one conditional handover command, according to an embodiment of the disclosure.

FIG. 11 is a diagram illustrating an operation of, when a source node prepares conditional handover for a multi-cell, adding one cell to one conditional handover command, according to an embodiment of the disclosure.

Referring to FIG. 11, a communication system may include a terminal (UE), a source node (SN), and a target node (TN). The source node may determine conditional handover (CHO) in 1110. The source node requests the target node to prepare handover for multiple target cells, in 1120. The source node may transmit, to the target node, a handover preparation message (handover preparation INM message) including a condition for each cell or group of cells.

When handover commands for target cells are generated, the target node may generate handover commands by adding, to one handover command, dedicated configuration information and handover condition configuration information for multiple candidate target cells, in 1130. In this case, included in reconfigWithSync iE, but is located outside spcellConfigCommon. A third option is that a handover command message is located inside spcellConfigCommon IE. A last option is a method in which a handover command message is located inside cellGroupConfig and is located outside SpcellConfig. In particular, in this case, a handover command message may be located inside measConfig IE, wherein each condition is displayed with a candidate target cell ID, that is, a physical cell ID or CGI.

As another configuration method, dedicated resource configuration information for each candidate target cell may be multi-listed at an SpcellConfig level by including target cell id information in SpcellConfig. Alternatively, by including target cell id information in a reconfigWithSync level, multi-listing may be made at the reconfigWithSync level. In the latter case, the dedicated configuration information of each target cell may be added to reconfigWithSync, and common configuration information for a cell may be located outside reconfigWithSync of SpcellConfig without a target cell id. Alternatively, the dedicated configuration information for each target cell may be transferred to SpcellConfigCommon by using a target cell id. Alternatively, by adding a target cell id to SpcellConfigDedicated which is located inside SpcellConfig and is located outside reconfigWithSync, dedicated resource configuration information of a corresponding target cell may be transferred to the terminal.

In another embodiment, there may be various methods of signaling a condition included in the RRCReconfiguration message. Each method is necessary for a method to reduce signal overhead. For the current source cell and each target cell or a specific target cell group, the following options are possible.

Opt1. measObject and reportConfig constituting each condition are signaled.

Opt2. A measObject id used in the current source spcell cell is referred to, and a separate reportConfig is signaled.

Opt3. As measObject, a target cell id (CGI or physical cell id), to which a corresponding condition is to be applied, and a separate reportConfig are signaled.

Opt4. As measObject, a target cell id (CGI or physical cell id), to which a corresponding condition is to be applied, and a reportConfig id used in the current source cell may be signaled. Alternatively, while signaling the reportConfig id used in the current source cell, only configuration information to be changed may be added.

Opt5. A measurement id used in the current spcell is signaled, and sub fields existing in corresponding measObject and reportConfig are reconfigured, so that a field changed from a currently used configuration may be signaled.

Opt6. Without a measurement id signal used in the current spcell, a measurement object and a report configuration, which are used when a report is performed for adding a target cell to which each condition is applied, are taken as a basis, and only sub fields of the measurement object and report configuration are reconfigured so as to be signaled. The terminal recognizes this changed configuration as a delta configuration, and applies the same to measurement and condition evaluation for CHO performance conditions.

Parts that are changeable in the options may be, for example, an event type or an offset value used in each event type, threshold values of a serving cell and a target cell, an offset value for each frequency, an offset value for each cell, serving cell and target cell frequencies to be measured, subcarrier spacing information, SMTC information, a reference signal type, a maximum number of RSs or beams required for beam consolidation, a threshold value of beam-specific reception intensity for determination of each measurement beam, and the like.

In FIG. 7, FIG. 8, FIG. 9, FIG. 10, and FIG. 11, when the terminal receives an RRCReconfiguration message, if a source cell condition is included, the RRCReconfiguration-Complete message is always transferred to the source node. If only conditional handover-related configuration is included, when the terminal receives the reconfiguration message, a complete message may not be transferred. Instead, when a condition is invoked and conditional handover is started, if a corresponding target cell is successfully accessed, a complete message may be transmitted to the target cell.

Figure 13:
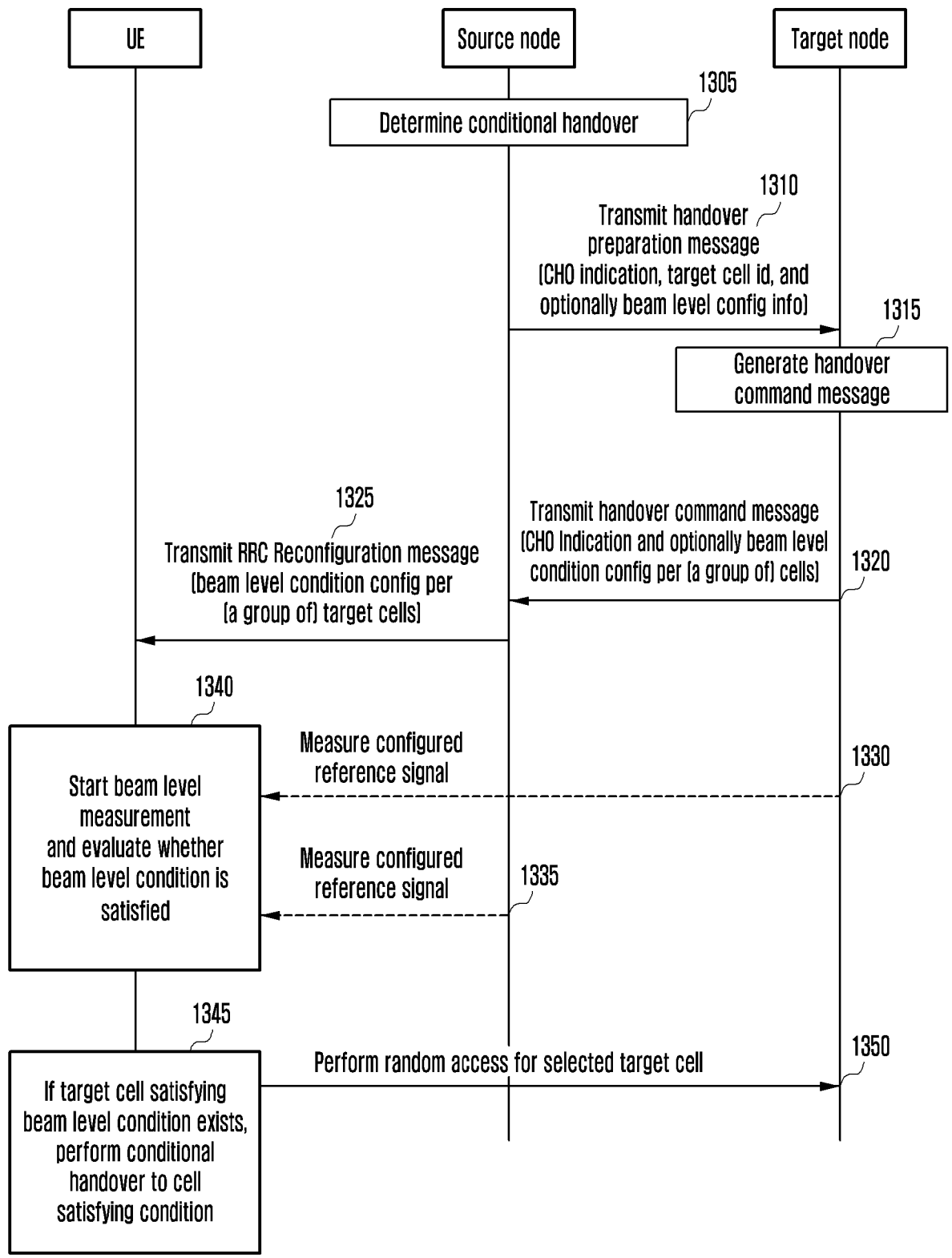
FIG. 13 is a diagram illustrating a signal flow of a procedure of performing conditional handover when only a beam level condition is given to a terminal without a cell level condition, which corresponds to 2-1th and 2-2th embodiments, according to an embodiment of the disclosure.

FIG. 13 is a signal flow diagram in a case where only a beam level condition is given to a terminal without a cell level condition, which corresponds to 2-1th and 2-2th embodiments according to an embodiment of the disclosure. Referring to FIG. 13, a source node (serving base station) may determine to perform conditional handover (CHO), in 1305. Then, the source node may transmit a message for requesting conditional handover preparation to a target node, in 1310. The message for requesting conditional handover preparation may include an indication of a handover message for conditional handover. The message for requesting conditional handover preparation may include a beam-based condition configuration and a cell id of a candidate cell for conditional handover.

The target node having received the message for requesting conditional handover preparation may determine whether a target cell indicated by the serving node is able to perform conditional handover, and may generate a conditional handover command message by adding dedicated resource configuration information to be used in the target cell, in 1315. The conditional handover command message may include beam level condition configuration information for candidate target cells capable of performing conditional handover. The target node may transfer the generated conditional handover command message to the source node, in 1320.

The source node may transfer the conditional handover command received from the target node to a terminal via an RRCReconfiguration message, in 1325. If the source node has transferred no beam level configuration condition information to the target node during previous handover preparation, the handover command message may not include a beam level configuration condition, and in this case, the source node may directly add, to the RRCReconfiguration message, a beam level configuration condition applied to each of candidate target nodes, so as to transfer the beam level configuration condition to the terminal.

The terminal having received the RRCReconfiguration message may start measuring intensities of beams configured in the source cell and each target cell with respect to beams configured for a beam level condition configuration, and may evaluate whether the measured intensities of the beams satisfy the beam level condition, in 1330, 1335, and 1340.

If, during measurement of the intensities of the beams, a target cell satisfying the transferred beam level condition exists, the terminal may perform conditional handover to the target cell satisfying the beam level condition, in 1345. The terminal may perform random access to the target cell selected to perform conditional handover, in 1350.

According to the 2-1th embodiment, a serving base station (source node) may transmit a configuration for conditional handover to a terminal. The serving base station may configure a beam intensity-based event condition with respect to each candidate target cell or candidate target cell group subject to handover. As configuration information of the beam intensity-based condition, specific beams of the serving cell, i.e., N beam indices of synchronization signal blocks (SSBs) or channel state information reference signals (CSI-RSs), and/or M specific beams of a corresponding target cell, i.e., indices of SSBs or CSI-RSs, may be given to the terminal. An evaluation condition for comparison between the beams of the serving cell and the beams of the target cell may be given to the terminal. As a unit of intensity of each beam, reference signal received power (RSRP), reference signal received quality (RSRQ), received signal strength indicator (RSSI), or reference signal signal-to-interference-and-noise ratio (Rs-SINR) may be considered. If the aforementioned beam information is given to the terminal, the terminal may start beam measurement and may determine whether a measured beam satisfies the evaluation condition. If the beam of the target cell satisfies the given condition, the terminal may perform handover to the target cell that satisfies the condition.

There may be type A1 as a beam intensity evaluation condition. As a parameter related to type A1, a threshold value for comparison with a beam intensity value may be configured for the terminal. When N beam indices, event type information, and a threshold value of the serving cell are given, the terminal may measure reception intensities of configured N beams of the serving cell, and if an average value of the intensities of the N beams, a minimum value among the intensities of the N beams, or a maximum value among the intensities of the N beams of the serving cell is greater than the given threshold value, the terminal consider that event A1 is satisfied.

There may be type A2 as another beam intensity evaluation condition. As a parameter related to type A2, a threshold value to be compared with a beam intensity value may be configured for the terminal. When N beam indices, event type information, and a threshold value of the serving cell are given, the terminal may measure reception intensities of configured N beams of the serving cell, and if an average value of the intensities of the N beams, a minimum value among the intensities of the N beams, or a maximum value among the intensities of the N beams of the serving cell is smaller than the given threshold value, the terminal consider that event A2 is satisfied.

There may be type A3 as another beam intensity evaluation condition. As a parameter related to type A3, an offset value for comparison between a beam intensity of the serving cell and a beam intensity of the target cell may be configured for the terminal. When beam indices of the serving cell, beam indices of the target cell, event type information, and offset values are given, the terminal may measure reception intensities of configured N beams of the serving cell and reception intensities of configured M beams of the target cell, and if an average value of the intensities of the N beams of the serving cell is smaller than an average value of the intensities of the M beams of the target cell by an offset, the terminal may consider that event A3 is satisfied. Alternatively, if a minimum value among the intensities of the N beams of the serving cell is smaller than a minimum value among the intensities of the M beams of the target cell by an offset, or if a maximum value among the intensities of the N beams of the serving cell is smaller than a maximum value among the intensities of the M beams of the target cell by an offset, the terminal may consider that event A3 is satisfied. Alternatively, if the maximum value among the intensities of the N beams of the serving cell is smaller than the minimum value among the intensities of the M beams of the target cell by an offset, the terminal may consider that event A3 is satisfied.

There may be type A4 as another beam intensity evaluation condition. As a parameter related to type A4, a threshold value for comparison with a beam intensity value may be configured for the terminal. When M beam indices, event type information, and a threshold value of the target cell are given, the terminal may measure reception intensities of configured M beams of the target cell, and if an average value of the intensities of the M beams, a minimum value among the intensities of the M beams, or a maximum value among the intensities of the M beams of the target cell is greater than the given threshold, the terminal may consider that event A4 is satisfied.

There may be type A5 as another beam intensity evaluation condition. As parameters related to type A5, a threshold value for comparison with a beam intensity value of the serving cell and a threshold value for comparison with a beam intensity value of the target cell may be configured for the terminal. When N beam indices of the serving cell, a threshold value for the serving cell, M beam indices of the target cell, a threshold value for the target cell, and event type information are given, the terminal may measure reception intensities of configured N beams of the serving cell and may measure reception intensities of configured M beams of the target cell, wherein if an average value of the intensities of the N beams, a maximum value among the intensities of the N beams, or a minimum value among the intensities of the N beams of the serving cell is smaller than the threshold value for the serving cell, and if an average value of the intensities of the M beams, a minimum value among the intensities of the M beams, or a maximum value among the intensities of the M beams of the target cell is greater than the given threshold value, the terminal may consider that event A5 is satisfied.

In parameters related to aforementioned types A1 to A5, the parameter related to type A3 may include a serving cell-specific offset and a measurement object-specific offset of the serving cell, and values of these parameters may be added to a serving cell part of the offset of type A3 described above. The parameter related to type A3 may also include a target cell-specific offset and a measurement object-specific offset of the target cell, and values of these parameters may be added to a target cell part of the offset of type A3 described above. The parameter related to type A4 may include a target cell-specific offset and a measurement object-specific offset of the target cell, and values of these parameters may be added to value parts of the target beams so as to be used for comparison with the threshold value of type A4 mentioned above. The parameters related to type A5 may include a target cell-specific offset and a measurement object-specific offset of the target cell, and values of these parameters may be added to value parts of the target beams so as to be used for comparison with the threshold value for the target cell of type A5 mentioned above.

According to the 2-2th embodiment, a serving base station may transmit a configuration for conditional handover to a terminal. The serving base station may configure a beam intensity-based event condition for the terminal, with respect to each candidate target cell or candidate target cell group subject to handover. As configuration information of the beam intensity-based condition, N which is the number of beams to be considered for an event determination condition in the serving cell and/or M which is the number of beams to be considered in an event determination condition for a target cell may be given to the terminal. Configuration information on a reference signal (RS) type of each beam, which is to be considered in the serving cell and/or the target cell, may also be transferred to the terminal. The configuration information on an RS type may be information indicating that an RS type of each beam is SSB or CSI-RS. An evaluation condition for comparison between beams of the serving cell and beams of the target cell may be given to the terminal. As a unit of intensity of each beam, RSRP, RSRQ, RSSI, or Rs-SINR may be considered. If the information on the number of beams described above is given to the terminal, the terminal may start measuring all beams corresponding to a corresponding RS type and may determine whether the measured beams satisfy the evaluation condition. If the beams of the target cell satisfy the given condition, the terminal may perform handover to the target cell satisfying the condition.

There may be type A1 as a beam intensity evaluation condition. As a parameter related to type A1, a threshold value for comparison with a beam intensity value may be configured for the terminal. When an N value, event type information, and a threshold value of the serving cell are given, the terminal may measure reception intensities of all beams of the serving cell, and if an average value of the intensities of the N beams having the greatest reception intensity in order among the measured beams of the serving cell, a minimum value among the intensities of the N beams having the greatest reception intensity in order, or a maximum value among the intensities of the N beams having the greatest reception intensity in order is greater than the given threshold value, the terminal may consider that event A1 is satisfied.

There may be type A2 as another beam intensity evaluation condition. As a parameter related to type A2, a threshold value for comparison with a beam intensity value may be configured for the terminal. When an N value, event type information, and a threshold value of the serving cell are given, the terminal may measure reception intensities of all beams of the serving cell, and if an average value of the intensities of the N beams having the greatest reception intensity in order among the measured beams of the serving cell, a minimum value among the intensities of the N beams having the greatest reception intensity in order, or a maximum value among the intensities of the N beams having the greatest reception intensity in order is smaller than the given threshold value, the terminal may consider that event A2 is satisfied.

There may be type A3 as another beam intensity evaluation condition. As a parameter related to type A3, an offset value for comparison between a beam intensity of the serving cell and a beam intensity of the target cell may be configured for the terminal. When N which is the number of beams of the serving cell, M which is the number of beams of the target cell, event type information, and offset values are given, the terminal may measure reception intensities of all beams of the serving cell and reception intensities of all beams of the target cell, and if an average value of the intensities of the N beams having the greatest reception intensity in order among the measured beams of the serving cell is smaller than an average value of the intensities of the M beams having the greatest reception intensity in order among the measured beams of the target cell by an offset, the terminal may consider that event A3 is satisfied. Alternatively, if a minimum value among the intensities of the N beams of the serving cell, which have the greatest reception intensity in order, is smaller by an offset than a minimum value among the intensities of the M beams of the target cell, which have the greatest reception intensity in order, or if a maximum value among the intensities of the N beams of the serving cell, which have the greatest reception intensity in order, is smaller by an offset than a maximum value among the intensities of the M beams of the target cell, which have the greatest reception intensity in order, the terminal may consider that event A3 is satisfied. Alternatively, if the maximum value among the intensities of the N beams of the serving cell, which have the greatest reception intensity in order, is smaller by an offset than the minimum value among the intensities of the M beams of the target cell, which have the greatest reception intensity in order, the terminal may consider that event A3 is satisfied.

There may be type A4 as another beam intensity evaluation condition. As a parameter related to type A4, a threshold value for comparison with a beam intensity value may be configured for the terminal. When an M value, event type information, and a threshold value of the target cell are given, the terminal may measure reception intensities of all beams of the target cell, and if an average value of the intensities of the M beams having the greatest reception intensity in order among the measured beams of the target cell, a minimum value among the intensities of the M beams having the greatest reception intensity in order, or a maximum value among the intensities of the M beams having the greatest reception intensity in order is greater than the given threshold value, the terminal may consider that event A4 is satisfied.

There may be type A5 as another beam intensity evaluation condition. As parameters related to type A5 a threshold value for comparison with a beam intensity value of the serving cell and a threshold value for comparison with a beam intensity value of the target cell may be configured for the terminal. When an N value of the serving cell, a threshold value for the serving cell, an M value of the target cell, a threshold value for the target cell, and event type information are given, the terminal may measure reception intensities of all beams of the serving cell and may measure reception intensities of all beams of the target cell, wherein if an average value of the intensities of N beams having the greatest reception intensity in order among the measured beams of the serving cell, a maximum value among the intensities of the N beams having the greatest reception intensity in order, or a minimum value among the intensities of the N beams having the greatest reception intensity in order is smaller than the threshold value for the serving cell, and if an average value of the intensities of M beams having the greatest reception intensity in order among the measured beams of the target cell, a minimum value among the intensities of the M beams having the greatest reception intensity in order, or a maximum value among the intensities of the M beams having the greatest reception intensity in order is greater than the given threshold value, the terminal may consider that event A5 is satisfied.

In parameters related to aforementioned types A1 to A5, the parameter related to type A3 may include a serving cell-specific offset and a measurement object-specific offset of the serving cell, and values of these parameters may be added to a serving cell part of the offset of type A3 mentioned above. The parameter related to type A3 may also include a target cell-specific offset and a measurement object-specific offset of the target cell, and values of these parameters may be added to a target cell part of the offset of type A3 mentioned above. The parameter related to type A4 may include a target cell-specific offset and a measurement object-specific offset of the target cell, and values of these parameters may be added to value parts of the target beams so as to be used for comparison with the threshold value of type A4 mentioned above. The parameters related to type A5 may include a target cell-specific offset and a measurement object-specific offset of the target cell, and values of these parameters may be added to value parts of the target beams so as to be used for comparison with the threshold value for the target cell of type A5 mentioned above.

Figure 14:
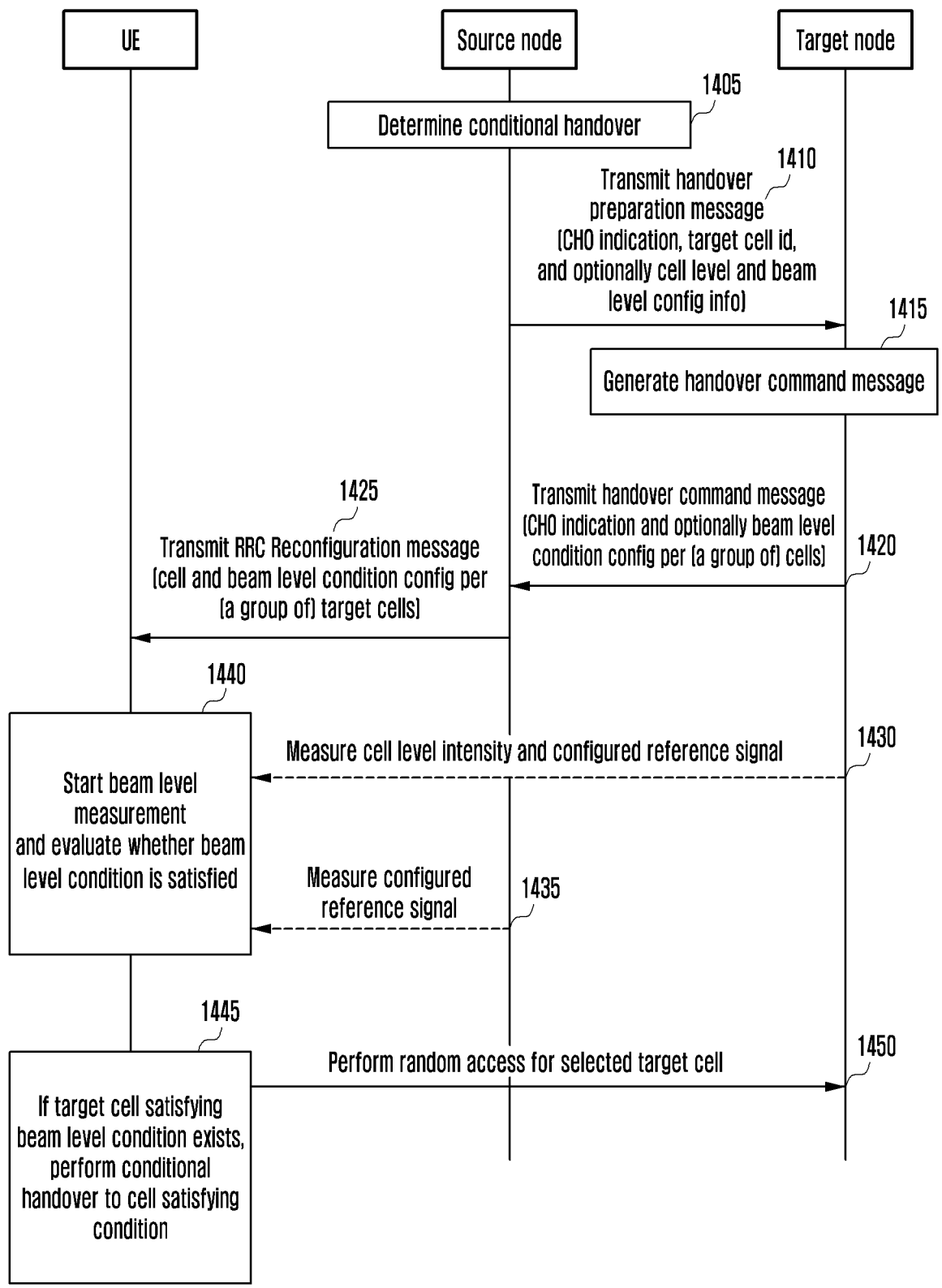
FIG. 14 is a diagram illustrating a signal flow of a procedure of performing conditional handover when both a cell level condition and a beam level condition are given to a terminal, which corresponds to 2-3th and 2-4th embodiments, according to an embodiment of the disclosure.

FIG. 14 is a signal flow diagram in a case where both a cell level condition and a beam level condition are given to a terminal, which corresponds to 2-3th and 2-4th embodiments according to an embodiment of the disclosure. Referring to FIG. 14, a source node may determine to perform conditional handover (CHO), in 1405. Then, the source node may transmit a message for requesting conditional handover preparation to a target node, in 1410. The message for requesting conditional handover preparation may include an indication of a handover message for conditional handover. The message for requesting conditional handover preparation may include a cell id and cell-based and beam-based condition configurations for a candidate cell of conditional handover.

The target node having received the message for requesting conditional handover preparation may determine whether a target cell indicated by the serving node is able to perform conditional handover, and may generate a conditional handover command message by adding dedicated resource configuration information to be used in the target cell, in 1415. The conditional handover command message may include cell level and beam level condition configuration information for candidate target cells capable of performing conditional handover. The target node may transfer the generated conditional handover command message to the source node, in 1420.

The source node may transfer the conditional handover command received from the target node to a terminal via an RRCReconfiguration message, in 1425. If the source node has transferred no cell level and beam level configuration condition information to the target node during previous handover preparation, the handover command message may not include cell level and beam level configuration conditions, and in this case, the source node may directly add, to the RRCReconfiguration message, cell level and beam level configuration conditions applied to each of candidate target nodes, so as to transfer the cell level and beam level configuration conditions to the terminal.

The terminal having received the RRCReconfiguration message may start measuring intensities of beams configured for the cell level and beam level conditions for each candidate target cell and source cell, and may evaluate whether the measured intensities of the beams satisfy the cell level and beam level conditions, in 1430, 1435, and 1440.

If, during measurement of the intensities of the beams, a target cell satisfying the transferred cell level condition exists, the terminal may determine again whether the target cell satisfying the cell level condition satisfies the beam level condition configured for the target cell, and if a target cell satisfying even the beam level condition exists, the terminal may perform conditional handover to the target cell, in 1445. The terminal may perform random access to the target cell selected to perform conditional handover, in 1450.

According to the 2-3th embodiment, a serving base station may transmit a configuration for conditional handover to a terminal. The serving base station may concurrently configure a cell intensity-based condition and a beam intensity-based condition with respect to each candidate target cell or candidate target cell group subject to handover. The cell intensity-based condition may include report configuration information and measurement object information for determination of A1, A2, A3, A4, A5, and A6 events and corresponding events in LTE and NR standards and beam consolidation-related configurations (RS type, threshold value for determining a reception intensity of each beam, maximum number of beams to be considered for cell intensity among beams having a value exceeding the threshold value, etc.). Separately from the above, the serving base station may configure the beam intensity-based event condition to the terminal. As configuration information of the beam intensity-based condition, specific beams of the serving cell, i.e., N beam indices of synchronization signal blocks (SSBs) or channel state information reference signals (CSI-RSs), and/or M specific beams of a corresponding target cell, i.e., indices of SSBs or CSI-RSs, may be given to the terminal. An evaluation condition for comparison between beams of the serving cell and beams of the target cell may be given to the terminal. As a unit of intensity of each beam, RSRP, RSRQ, RSSI, or Rs-SINR may be considered. If the aforementioned beam information is given to the terminal, the terminal may start beam measurement and may determine whether a measured beam satisfies the evaluation condition.

If, with respect to the cell intensity-based condition and the beam intensity-based condition, the target cell satisfies cell intensity-based condition given in the conditional handover configuration information and the target cell also satisfies the beam intensity condition given to the target cell, the terminal may perform handover to the target cell satisfying both conditions. Cell and beam intensity measurement may be performed when corresponding cell and beam intensity-based condition configuration information is given. If there are multiple target cells satisfying the cell intensity-based condition at the same time, the terminal may preferentially perform handover to a target cell satisfying the given beam intensity-based condition among target cells satisfying the cell intensity-based condition.

There may be type A1 as a beam intensity evaluation condition. As a parameter related to type A1, a threshold value for comparison with a beam intensity value may be configured for the terminal. When N beam indices, event type information, and a threshold value of the serving cell are given, the terminal may measure reception intensities of configured N beams of the serving cell, and if an average value of the intensities of the N beams, a minimum value among the intensities of the N beams, or a maximum value among the intensities of the N beams of the serving cell is greater than the given threshold value, the terminal may consider that event A1 is satisfied. There may be type A2 as another beam intensity evaluation condition. As a parameter related to type A2, a threshold value for comparison with a beam intensity value may be configured for the terminal. When N beam indices, event type information, and a threshold value of the serving cell are given, the terminal may measure reception intensities of configured N beams of the serving cell, and if an average value of the intensities of the N beams, a minimum value among the intensities of the N beams, or a maximum value among the intensities of the N beams of the serving cell is smaller than the given threshold value, the terminal may consider that event A2 is satisfied.

There may be type A3 as another beam intensity evaluation condition. As a parameter related to type A3, an offset value for comparison between a beam intensity of the serving cell and a beam intensity of the target cell may be configured for the terminal. When beam indices of the serving cell, beam indices of the target cell, event type information, and offset values are given, the terminal may measure reception intensities of configured N beams of the serving cell and reception intensities of configured M beams of the target cell, and if an average value of the intensities of the N beams of the serving cell is smaller than an average value of the intensities of the M beams of the target cell by an offset, the terminal may consider that event A3 is satisfied. Alternatively, if a minimum value among the intensities of the N beams of the serving cell is smaller than a minimum value among the intensities of the M beams of the target cell by an offset, or if a maximum value among the intensities of the N beams of the serving cell is smaller than a maximum value among the intensities of the M beams of the target cell by an offset, the terminal may consider that event A3 is satisfied. Alternatively, if the maximum value among the intensities of the N beams of the serving cell is smaller than the minimum value among the intensities of the M beams of the target cell by an offset, the terminal may consider that event A3 is satisfied.

There may be type A4 as another beam intensity evaluation condition. As a parameter related to type A4, a threshold value for comparison with a beam intensity value may be configured for the terminal. When M beam indices, event type information, and a threshold value of the target cell are given, the terminal may measure reception intensities of configured M beams of the target cell, and if an average value of the intensities of the M beams, a minimum value among the intensities of the M beams, or a maximum value among the intensities of the M beams of the target cell is greater than the given threshold value, the terminal may consider that event A4 is satisfied.

There may be type A5 as another beam intensity evaluation condition. As parameters related to type A5, a threshold value for comparison with a beam intensity value of the serving cell and a threshold value for comparison with a beam intensity value of the target cell may be configured for the terminal. When N beam indices of the serving cell, a threshold value for the serving cell, M beam indices of the target cell, a threshold value for the target cell, and event type information are given, the terminal may measure reception intensities of configured N beams of the serving cell and may measure reception intensities of configured M beams of the target cell, wherein if an average value of the intensities of the N beams, a maximum value among the intensities of the N beams, or a minimum value among the intensities of the N beams of the serving cell is smaller than the threshold value for the serving cell, and if an average value of the intensities of the M beams, a minimum value among the intensities of the M beams, or a maximum value among the intensities of the M beams of the target cell is greater than the given threshold value, the terminal may consider that event A5 is satisfied.

In parameters related to aforementioned types A1 to A5, the parameter related to type A3 may include a serving cell-specific offset and a measurement object-specific offset of the serving cell, and values of these parameters may be added to a serving cell part of the offset of type A3 described above. The parameter related to type A3 may also include a target cell-specific offset and a measurement object-specific offset of the target cell, and values of these parameters may be added to a target cell part of the offset of type A3 mentioned above. The parameter related to type A4 may include a target cell-specific offset and a measurement object-specific offset of the target cell, and values of these parameters may be added to value parts of the target beams (e.g., beams configured to be measured in the target cell) so as to be used for comparison with the threshold value of type A4 mentioned above. The parameters related to type A5 may include a target cell-specific offset and a measurement object-specific offset of the target cell, and values of these parameters may be added to value parts of the target beams so as to be used for comparison with the threshold value for the target cell of type A5 mentioned above.

As an example of the 2-3th embodiment described above, in handover preparation in each target cell, contention-free random access may be performed using dedicated random access configuration information for specific beams of a corresponding target cell. Configuration information for contention-free random access may include an index of a beam capable of transmitting a contention-free RACH preamble, contention-free preamble information to be used in the beam, time/frequency information used for preamble transmission in the beam, threshold value information to be considered when performing contention-free random access if a beam, the intensity of which exceeds a specific threshold value, exists among corresponding beams, and the like. The target cell for which conditional handover preparation has been requested may configure contention-free random access resources for specific beams, and may add, to a corresponding conditional handover command, a cell-based condition and a beam intensity-based condition for the target cell so as to transmit the conditional handover command to the terminal. Alternatively, the source cell may receive the information of the target cell and transmit the cell-based and beam intensity-based conditions to the terminal. Information of the beam-based condition may be as follows. For each target cell, the terminal may be notified of, as the beam intensity-based condition, an evaluation condition of type A4 and beam index information configured to enable transmission of a contention free random access preamble as index information of M beams of the target cell, which is to be used for evaluation of type A4, and the terminal may be notified of, as a threshold value of type A4, a threshold value for beam evaluation when contention-free random access is performed. In order to perform conditional handover, the terminal may evaluate the cell-based condition, may preferentially select, among cells satisfying the cell-based condition, target cells satisfying the beam intensity-based condition of type A4 from among cells for which contention-free random access has been configured, and may perform conditional handover to one of the selected cells.

According to the 2-4th embodiment, a serving base station may transmit a configuration for conditional handover to a terminal. The serving base station may concurrently configure a cell intensity-based condition and a beam intensity-based condition with respect to each candidate target cell or candidate target cell group subject to handover. The cell intensity-based condition may include report configuration information and measurement object information for determination of A1, A2, A3, A4, A5, and A6 events and corresponding events in LTE and NR standards and beam consolidation-related configurations (RS type, threshold value for determining a reception intensity of each beam, maximum number of beams to be considered for cell intensity among beams having a value exceeding the threshold value, etc.). Separately from the above, the serving base station may configure the beam intensity-based event condition to the terminal. As configuration information of the beam intensity-based condition, N which is the number of beams to be considered for an event determination condition in the serving cell and/or M which is the number of beams to be considered in an event determination condition for a target cell may be given to the terminal. Configuration information on a reference signal (RS) type of each beam, which is to be considered in the serving cell and/or the target cell, may also be transferred to the terminal. The configuration information on an RS type may be information indicating that an RS type of each beam is SSB or CSI-RS. An evaluation condition for comparison between beams of the serving cell and beams of the target cell may be given to the terminal. As a unit of intensity of each beam, RSRP, RSRQ, RSSI, or Rs-SINR may be considered. If the information on the number of beams described above is given to the terminal, the terminal may start measuring all beams corresponding to a corresponding RS type and may determine whether the measured beams satisfy the evaluation condition.

If, with respect to the cell intensity-based condition and the beam intensity-based condition, the target cell satisfies cell intensity-based condition given in the conditional handover configuration information and the target cell also satisfies the beam intensity condition given to the target cell, the terminal may perform handover to the target cell satisfying both conditions. Cell and beam intensity measurement may be performed when corresponding cell and beam intensity-based condition configuration information is given. If there are multiple target cells satisfying the cell intensity-based condition at the same time, the terminal may preferentially perform handover to a target cell satisfying the given beam intensity-based condition among target cells satisfying the cell intensity-based condition.

There may be type A1 as a beam intensity evaluation condition. As a parameter related to type A1, a threshold value for comparison with a beam intensity value may be configured for the terminal. When an N value, event type information, and a threshold value of the serving cell are given, the terminal may measure reception intensities of all beams of the serving cell, and if an average value of the intensities of the N beams having the greatest reception intensity in order among the measured beams of the serving cell, a minimum value among the intensities of the N beams having the greatest reception intensity in order, or a maximum value among the intensities of the N beams having the greatest reception intensity in order is greater than the given threshold value, the terminal may consider that event A1 is satisfied.

There may be type A2 as another beam intensity evaluation condition. As a parameter related to type A2, a threshold value for comparison with a beam intensity value may be configured for the terminal. When an N value, event type information, and a threshold value of the serving cell are given, the terminal may measure reception intensities of all beams of the serving cell, and if an average value of the intensities of the N beams having the greatest reception intensity in order among the measured beams of the serving cell, a minimum value among the intensities of the N beams having the greatest reception intensity in order, or a maximum value among the intensities of the N beams having the greatest reception intensity in order is smaller than the given threshold value, the terminal may consider that event A2 is satisfied.

There may be type A3 as another beam intensity evaluation condition. As a parameter related to type A3, an offset value for comparison between a beam intensity of the serving cell and a beam intensity of the target cell may be configured for the terminal. When N which is the number of beams of the serving cell, M which is the number of beams of the target cell, event type information, and offset values are given, the terminal may measure reception intensities of all beams of the serving cell and reception intensities of all beams of the target cell, and if an average value of the intensities of the N beams having the greatest reception intensity in order among the measured beams of the serving cell is smaller by an offset than an average value of the intensities of the M beams having the greatest reception intensity in order among the measured beams of the target cell, the terminal may consider that event A3 is satisfied. Alternatively, if a minimum value among the intensities of the N beams of the serving cell, which have the greatest reception intensity in order, is smaller by an offset than a minimum value among the intensities of the M beams of the target cell, which have the greatest reception intensity in order, or if a maximum value among the intensities of the N beams of the serving cell, which have the greatest reception intensity in order, is smaller by an offset than a maximum value among the intensities of the M beams of the target cell, which have the greatest reception intensity in order, the terminal may consider that event A3 is satisfied. Alternatively, if the maximum value among the intensities of the N beams of the serving cell, which have the greatest reception intensity in order, is smaller by an offset than the minimum value among the intensities of the M beams of the target cell, which have the greatest reception intensity in order, the terminal may consider that event A3 is satisfied.

There may be type A4 as another beam intensity evaluation condition. As a parameter related to type A4, a threshold value for comparison with a beam intensity value may be configured for the terminal. When an M value, event type information, and a threshold value of the target cell are given, the terminal may measure reception intensities of all beams of the target cell, and if an average value of the intensities of the M beams having the greatest reception intensity in order among the measured beams of the target cell, a minimum value among the intensities of the M beams having the greatest reception intensity in order, or a maximum value among the intensities of the M beams having the greatest reception intensity in order is greater than the given threshold value, the terminal may consider that event A4 is satisfied.

There may be type A5 as another beam intensity evaluation condition. As parameters related to type A5 a threshold value for comparison with a beam intensity value of the serving cell and a threshold value for comparison with a beam intensity value of the target cell may be configured for the terminal. When an N value of the serving cell, a threshold value for the serving cell, an M value of the target cell, a threshold value for the target cell, and event type information are given, the terminal may measure reception intensities of all beams of the serving cell and may measure reception intensities of all beams of the target cell, wherein if an average value of the intensities of N beams having the greatest reception intensity in order among the measured beams of the serving cell, a maximum value among the intensities of the N beams having the greatest reception intensity in order, or a minimum value among the intensities of the N beams having the greatest reception intensity in order is smaller than the threshold value for the serving cell, and if an average value of the intensities of M beams having the greatest reception intensity in order among the measured beams of the target cell, a minimum value among the intensities of the M beams having the greatest reception intensity in order, or a maximum value among the intensities of the M beams having the greatest reception intensity in order is greater than the given threshold value, the terminal may consider that event A5 is satisfied.

In parameters related to aforementioned types A1 to A5, the parameter related to type A3 may include a serving cell-specific offset and a measurement object-specific offset of the serving cell, and values of these parameters may be added to a serving cell part of the offset of type A3 mentioned above. The parameter related to type A3 may also include a target cell-specific offset and a measurement object-specific offset of the target cell, and values of these parameters may be added to a target cell part of the offset of type A3 mentioned above. The parameter related to type A4 may include a target cell-specific offset and a measurement object-specific offset of the target cell, and values of these parameters may be added to value parts of the target beams so as to be used for comparison with the threshold value of type A4 mentioned above. The parameters related to type A5 may also include a target cell-specific offset and a measurement object-specific offset of the target cell, and values of these parameters may be added to value parts of the target beams so as to be used for comparison with the threshold value for the target cell of type A5 mentioned above.

In a case where a cell intensity-based condition and a beam intensity-based condition are concurrently given to a conditional handover command or configuration information, if there are multiple cells satisfying the cell intensity-based condition: 1) if there is no beam-level condition for each cell, or a beam-level condition is not satisfied even if there is the beam-level condition, the terminal may perform conditional handover according to implementation of the terminal or in the order of cells having the greatest reception intensity of beams of a target cell; 2) if there is a cell satisfying the beam-level condition for each cell, the terminal may perform conditional handover to the cell; or 3) if there are multiple cells satisfying the beam-level condition for each cell, the terminal may perform conditional handover according to implementation of the terminal or in the order of cells having the greatest reception intensity of beams of the target cell As another embodiment, an indication to consider a contention free RACH (CFRA) configuration as a beam level condition may be transferred to the terminal via an RRCReconfiguration message carrying a conditional handover command. That is, if the terminal receives an indication to consider a CFRA configuration as a beam level condition for a specific target cell or target cell group, the terminal may, after performing cell and beam measurement, if there are multiple target cells satisfying a cell level condition, consider, with respect to the target cells, the CFRA configuration (i.e., SSB/CSI-Rs id indicating a beam the intensity of which is to be considered, RSRP threshold, etc.) as a beam-based condition of the target cells. That is, if even one beam among beams for determination of a CFRA operation condition for a given target cell exceeds a given RSRP threshold, the target cell may be considered to satisfy the beam level condition. If there are multiple cells satisfying the beam level condition, the terminal may perform handover to a cell having the greatest cell level reception intensity from among the cells satisfying the beam level condition, or may select a cell to perform conditional handover according to a terminal implementation method.

Figure 15:
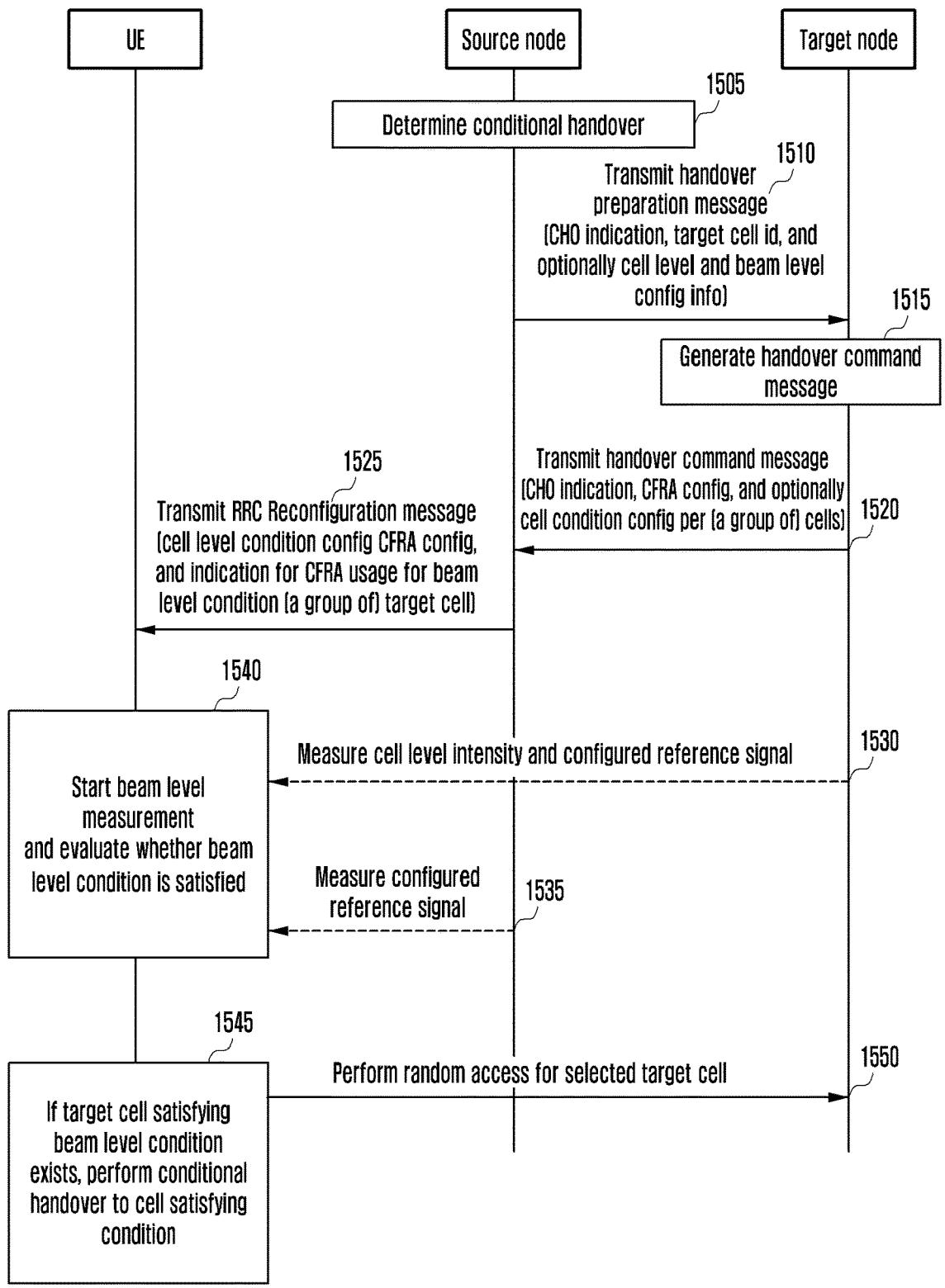
FIG. 15 is a diagram illustrating a signal flow of a procedure of performing conditional handover when a CFRA configuration is used as a beam level condition configuration, according to an embodiment of the disclosure.

FIG. 15 is a signal flow diagram of a procedure of performing conditional handover when a CFRA configuration is used as a beam level condition configuration, according to an embodiment of the disclosure. Referring to FIG. 15, a source node may determine to perform conditional handover, in 1505. Then, the source node may transmit a message for requesting conditional handover preparation to a target node, in 1510. The message for requesting conditional handover preparation may include an indication of a handover message for conditional handover. The message for requesting conditional handover preparation may include a cell id and cell-based and beam-based condition configurations for a candidate cell of conditional handover.

The target node having received the message for requesting conditional handover preparation may determine whether a target cell indicated by the serving node is able to perform conditional handover, and may generate a conditional handover command message by adding dedicated resource configuration information to be used in the target cell, in 1515. The conditional handover command message may include cell level and beam level condition configuration information for candidate target cells capable of performing conditional handover. If CFRA configuration information is configured for a specific target cell, the conditional handover command message may include an indication to use the CFRA configuration information instead of beam level condition configuration information with respect to the target cell, instead of including the beam level condition configuration information. The target node may transfer the generated conditional handover command message to the source node, in 1520.

The source node may transfer the conditional handover command received from the target node to a terminal via an RRCReconfiguration message, in 1525. If the source node has transferred no cell level and beam level configuration condition information to the target node during previous handover preparation, the handover command message may not include cell level and beam level configuration conditions, and in this case, the source node may directly add, to the RRCReconfiguration message, cell level and beam level configuration conditions applied to each of candidate target nodes, so as to transfer the cell level and beam level configuration conditions to the terminal.

The terminal having received the RRCReconfiguration message may start measuring intensities of beams configured for the cell level and beam level conditions for each candidate target cell and source cell, and may evaluate whether the measured intensities of the beams satisfy the cell level and beam level conditions, in 1530, 1535, and 1540. If the conditional handover command message transferred via the RRCReconfiguration message indicates that the beam level condition configuration information is replaced with the CFRA configuration information, the terminal may evaluate whether an event of type A4 (i.e., a case where a maximum value among the intensities of beams configured for the target cell exceeds a rsrpThresh threshold value), to which the threshold value of rsrpThresh has been applied, is satisfied with respect to beams configured as monitoring beams configured for CFRA.

If, during measurement of the intensities of the beams, a target cell satisfying the transferred cell level condition exists, the terminal may determine again whether the target cell satisfying the cell level condition satisfies the beam level condition (a case where there is an indication to use CFRA as the beam level condition, the A4 type event) configured for the target cell, and if a target cell satisfying even the beam level condition exists, the terminal may perform conditional handover to the target cell, in 1545. The terminal may perform random access to the target cell selected to perform conditional handover, in 1550.

Figure 16:
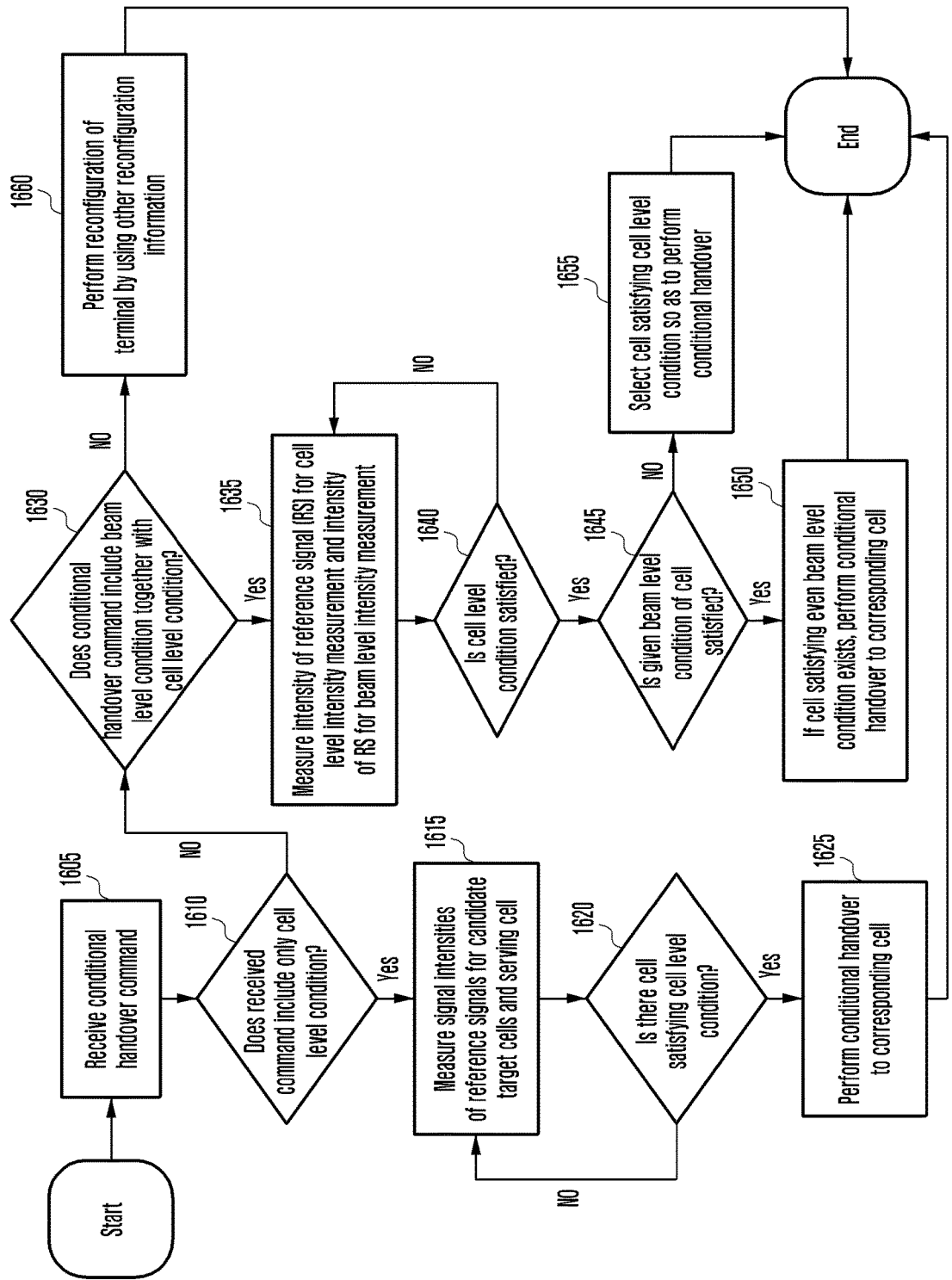
FIG. 16 is a diagram illustrating an operation of performing conditional handover in a terminal in consideration of beam level and cell level conditions, according to an embodiment of the disclosure.

FIG. 16 is a diagram illustrating an operation of performing conditional handover in a terminal in consideration of beam level and cell level conditions, according to an embodiment of the disclosure. When a terminal receives in 1605 a conditional handover (CHO) command, the terminal may determine in 1610 whether the received command includes only a cell level condition, or includes a beam level condition as well. If the conditional handover command includes only the cell level condition, the terminal may perform in 1615 signal intensity measurement for reference signals configured for cell level reception intensity measurement with respect to each of candidate target cells and a serving cell. If, during signal intensity measurement, a cell satisfying the cell level condition is discovered in 1620, the terminal may perform conditional handover to the cell in 1625. If the conditional handover command includes the beam level condition together with the cell level condition in 1630, the terminal may measure in 1635 intensities of reference signals (RSs) for beam level intensity measurement and the RSs for cell level intensity measurement configured for the candidate target cells and the source cell. If the cell level condition is satisfied in 1640, the terminal may determine, for only cells satisfying the cell level condition, whether the given beam level condition of each cell is satisfied, in 1645. If there are cells that also satisfy the beam level condition, the terminal may select one of the cells so as to perform conditional handover, in 1650. If the cell level condition is satisfied but there is no cell satisfying the beam level condition, the terminal may select one cell from among target cells satisfying the cell level condition so as to perform conditional handover, in 1655. If the conditional handover command does not include the cell level condition or the beam level condition, the terminal may perform only reconfiguration thereof by using other reconfiguration information, in 1660.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely particular embodiments that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. A method performed by a source node in a wireless communication system, the method comprising:
   transmitting, to a target node, a handover request message including at least one first identifier of at least one first target cell for a conditional handover;
   receiving, from the target node, a handover request acknowledge message including a handover command message and at least one second identifier of at least one second target cell for the conditional handover accepted by the target node based on the at least one first identifier, wherein a handover command message includes configuration information on the at least one second target cell for the conditional handover;
   generating condition information for the conditional handover, the condition information including a measurement identity associated with a measurement object and a report configuration; and
   transmitting, to a terminal, a radio resource control (RRC) reconfiguration message including the handover command message and the condition information for the conditional handover.

2. The method of claim 1, wherein the condition information is determined by the source node.

3. The method of claim 1,
   wherein the handover command message is transferred via a transparent container, and
   wherein the source node does not modify the configuration information of the at least one second target cell, which is included in the handover command message.

4. The method of claim 1,
   wherein the handover command message includes a delta configuration based on source configuration information, and
   wherein the RRC reconfiguration message includes information for one or multiple cells for the conditional handover.

5. A source node in a wireless communication system, the source node comprising:
   a transceiver; and
   a controller coupled with the transceiver and configured to:
      transmit, to a target node, a handover request message including at least one first identifier of at least one first target cell for a conditional handover,
      receive, from the target node, a handover request acknowledge message including a handover command message and at least one second identifier of at least one second target cell for the conditional handover accepted by the target node based on the at least one first identifier, wherein a handover command message includes configuration information on the at least one second target cell for the conditional handover,
      generate condition information for the conditional handover, the condition information including a measurement identity associated with a measurement object and a report configuration, and
      transmit, to a terminal, a radio resource control (RRC) reconfiguration message including the handover command message and the condition information for the conditional handover,
   wherein the condition information is configured based on a measurement identity associated with a measurement object and a report configuration.

6. The source node of claim 5, wherein the condition information is determined by the source node.

7. The source node of claim 5,
   wherein the handover command message is transferred via a transparent container, and
   wherein the source node does not modify the configuration information of the at least one second target cell, which is included in the handover command message.

8. The source node of claim 5,
   wherein the handover command message includes a delta configuration based on source configuration information, and wherein the RRC reconfiguration message includes information for one or multiple cells for the conditional handover.

9. A method performed by a target node in a wireless communication system, the method comprising:
receiving, from a source node, a handover request message including at least one first identifier of at least one first target cell for a conditional handover; and
transmitting, to the source node, a handover request acknowledge message including a handover command message and at least one second identifier of at least one second target cell for the conditional handover accepted by the target node based on the at least one first identifier, wherein a handover command message includes configuration information on the at least one second target cell for the conditional handover,
wherein the handover command message is used for a radio resource control (RRC) reconfiguration message to be transmitted to a terminal from the source node, the RRC reconfiguration message including the handover command message generated by the target node and condition information generated by the source node for the conditional handover, and
wherein the condition information includes a measurement identity associated with a measurement object and a report configuration.

10. The method of claim 9, wherein the condition information is determined by the source node.

11. The method of claim 9,
wherein the handover command message is transferred via a transparent container, and
wherein the source node does not modify the configuration information of the at least one second target cell, which is included in the handover command message.

12. The method of claim 9,
wherein the handover command message includes a delta configuration based on source configuration information, and
wherein the RRC reconfiguration message includes information for one or multiple cells for the conditional handover.

13. A target node in a wireless communication system, the target node comprising:
a transceiver; and
a controller coupled with the transceiver and configured to:
receive, from a source node, a handover request message including at least one first identifier of at least one first target cell for a conditional handover, and
transmit, to the source node, a handover request acknowledge message including a handover command message and at least one second identifier of at least one second target cell for the conditional handover accepted by the target node based on the at least one first identifier, wherein a handover command message includes configuration information on the at least one second target cell for the conditional handover,
wherein the handover command message is used for a radio resource control (RRC) reconfiguration message to be transmitted to a terminal from the source node, the RRC reconfiguration message including the handover command message generated by the target node and condition information generated by the source node for the conditional handover, and
wherein the condition information includes a measurement identity associated with a measurement object and a report configuration.

14. The target node of claim 13,
wherein the condition information is determined by the soured node,
wherein the handover command message is transferred via a transparent container, and
wherein the source node does not modify the configuration information of the at least one second target cell, which is included in the handover command message.

15. The target node of claim 13,
wherein the handover command message includes a delta configuration based on source configuration information, and
wherein the RRC reconfiguration message includes information for one or multiple cells for the conditional handover.

* * * * *